United States Patent [19]

Jones

[11] Patent Number: 5,499,136

[45] Date of Patent: Mar. 12, 1996

[54] STEREOGRAPHIC BOOK

[76] Inventor: Charles W. Jones, 305 Belleview Ave. East, Apt. 206, Seattle, Wash. 98102

[21] Appl. No.: 237,275

[22] Filed: May 3, 1994

Related U.S. Application Data

[63] Continuation-in-part of Ser. No. 907,785, Jul. 1, 1992, Pat. No. 5,309,280.

[51] Int. Cl.⁶ .................................................. G02B 27/22
[52] U.S. Cl. ......................... 359/474; 359/477; 359/467
[58] Field of Search ...................................... 359/474, 466, 359/477, 408, 467

[56] References Cited

U.S. PATENT DOCUMENTS

| | | | |
|---|---|---|---|
| 2,002,782 | 5/1935 | Lester | 359/408 |
| 2,334,483 | 11/1943 | Dennis | 359/467 |
| 2,616,333 | 11/1952 | Tinker | 359/467 |
| 2,683,391 | 7/1954 | Nichols | 359/467 |
| 4,549,785 | 10/1985 | Vitrac | 359/474 |
| 4,846,553 | 7/1989 | Rice | 359/817 |
| 5,204,776 | 4/1993 | Seamans et al. | 359/466 |
| 5,206,757 | 4/1993 | Cheng et al. | 359/408 |

OTHER PUBLICATIONS

"No one will ever look at advertising the same way again!", 3D Viewer Brochure, California, pp. 1–4, date unknown.
"Meet the 3DMark E3D Viewer", E3D Viewer Brochure, 3DMARK, California, pp. 1–2, date unknown.
"If you think you've seen 3–D before, hold your breath", Angalifics Brochure, 3DMARK, California, pp. 1–5, date unknown.
"You loved us in 3D. Wait till you see us in 2D.", Monoviewer Brochure, 3DMARK, California, pp. 1–4, date unknown.

*Primary Examiner*—Paul M. Dzierzynski
*Assistant Examiner*—Darren E. Schuberg
*Attorney, Agent, or Firm*—Barnes & Thornburg

[57] ABSTRACT

A stereographic book includes a base portion, a plurality of pages having text and stereographic imagery thereon, and a fastener for coupling the plurality of pages to the base portion about a page pivotal axis. The stereographic book also includes a stereographic viewer having a viewer body and a lens system, and a coupling section formed integrally with the base portion and the viewer body for pivotably coupling the stereographic viewer to the base portion. The coupling section including an articulated section defining at least two pivotal axes which are generally parallel to the page pivotal axis to facilitate alignment and focal adjustment of the stereographic viewer relative to the plurality of pages.

19 Claims, 10 Drawing Sheets

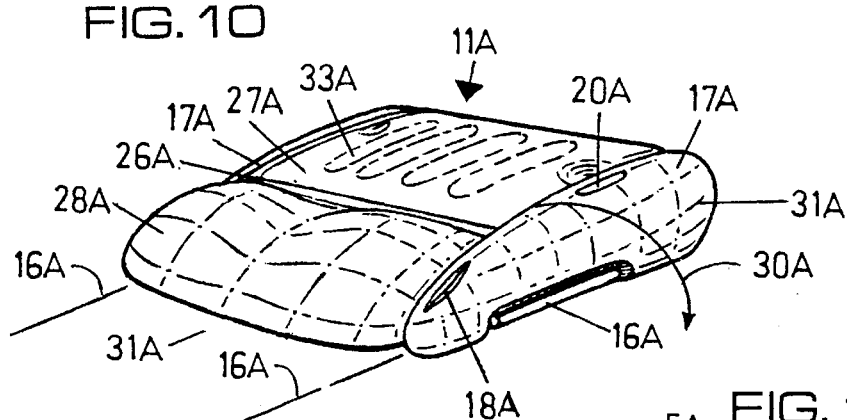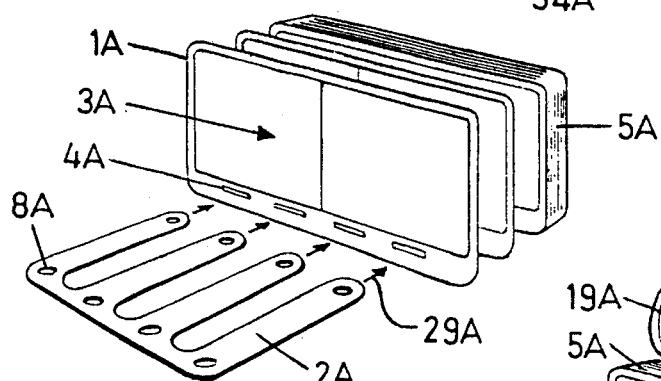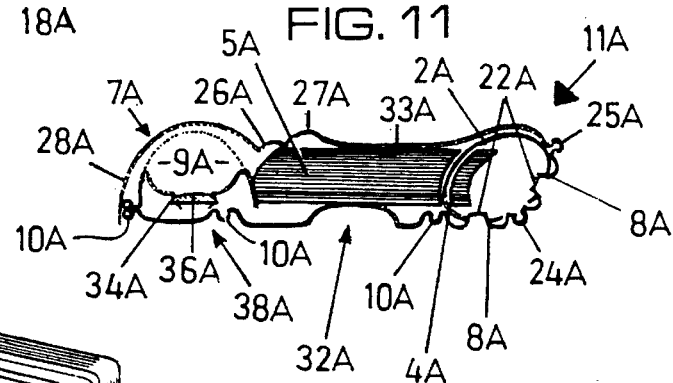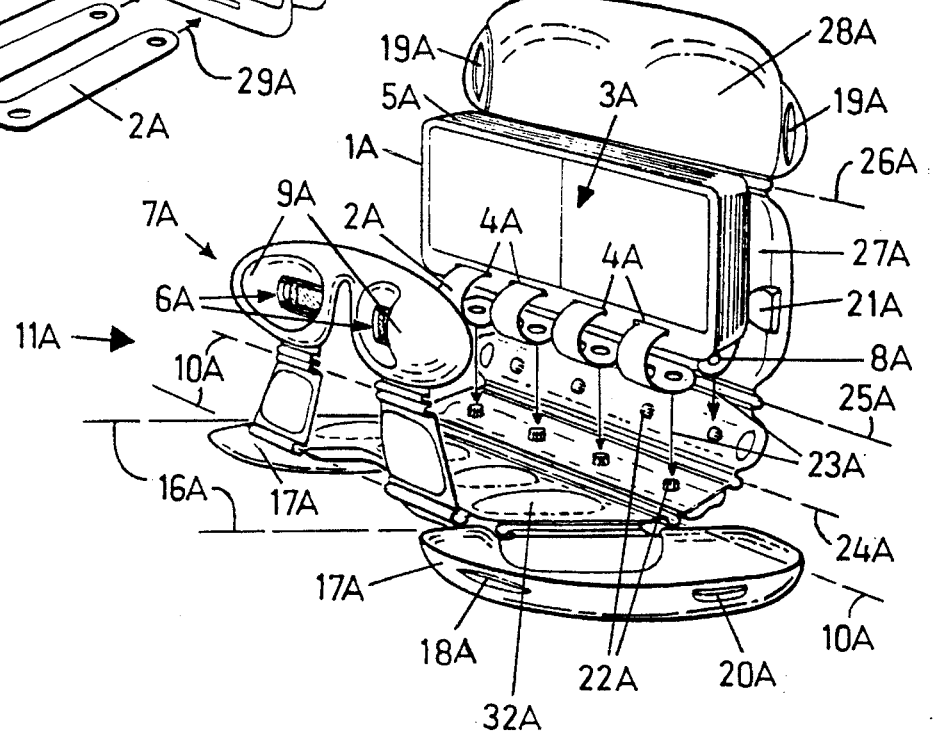

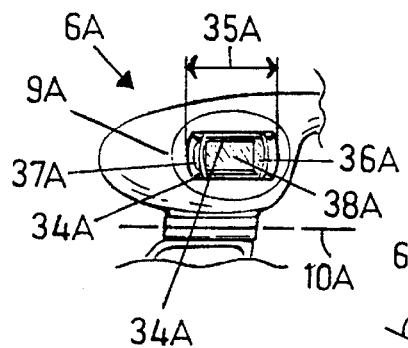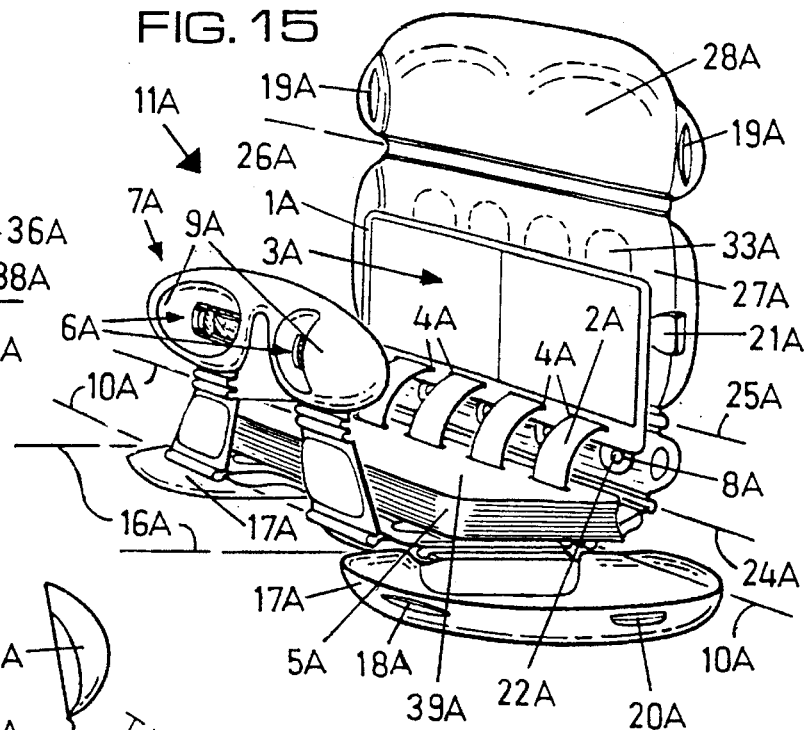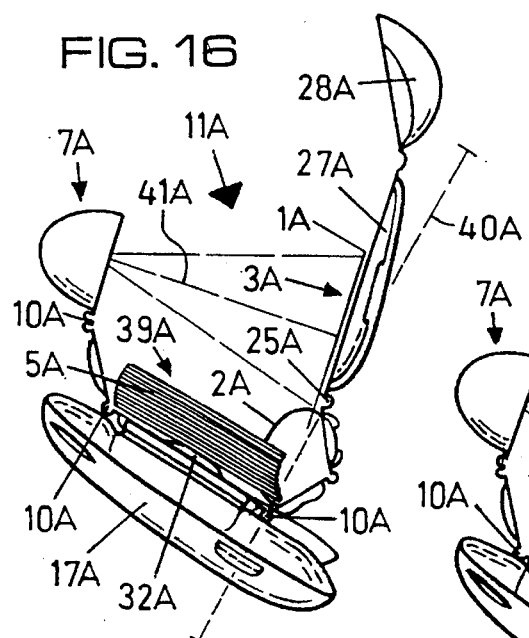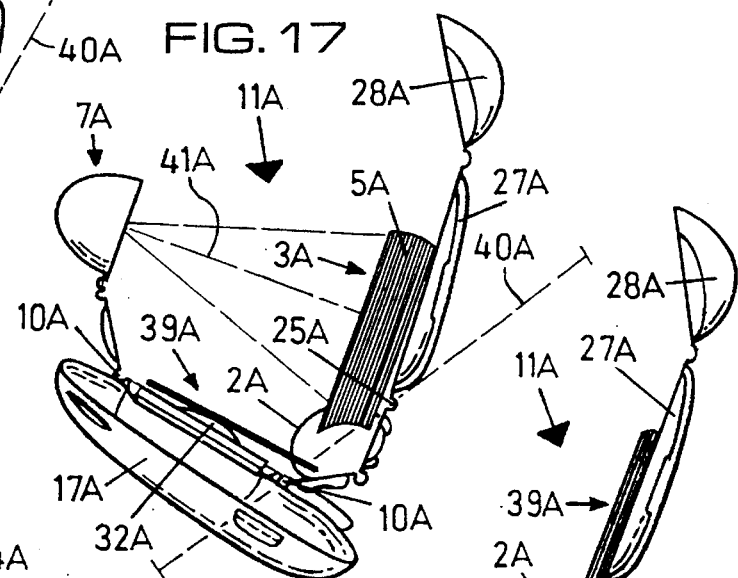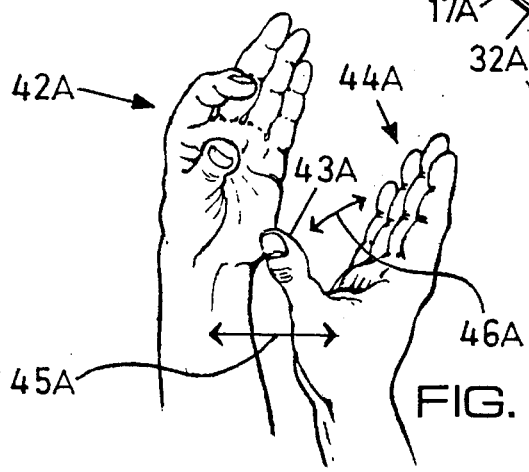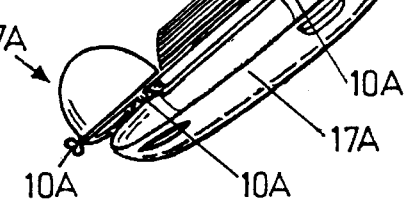

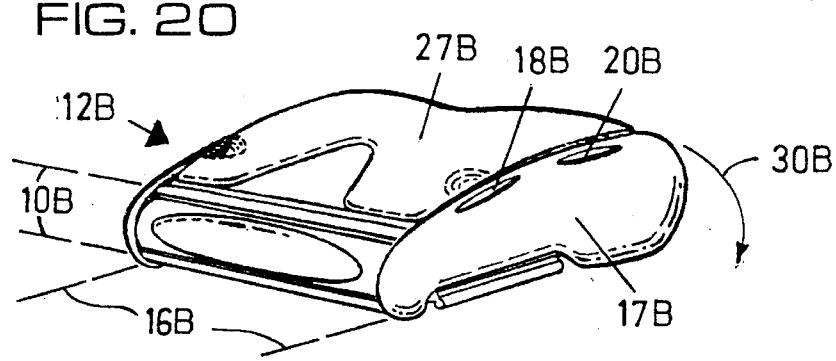
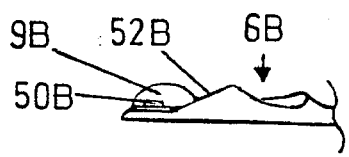
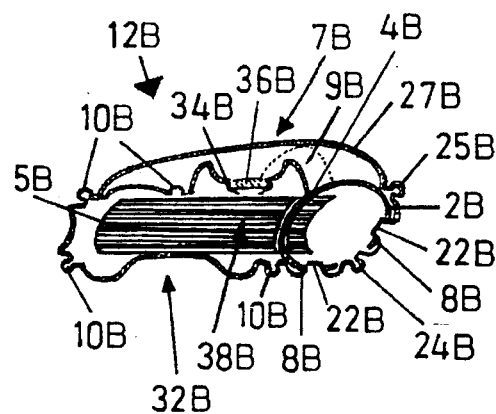
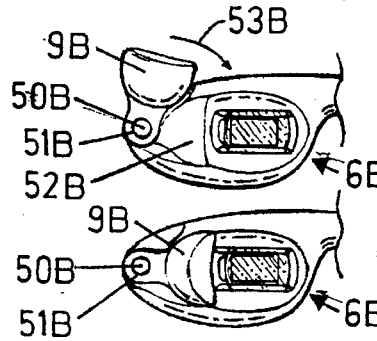
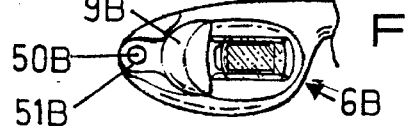
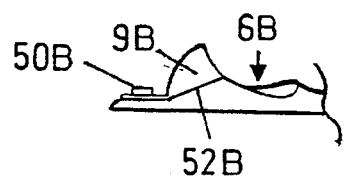
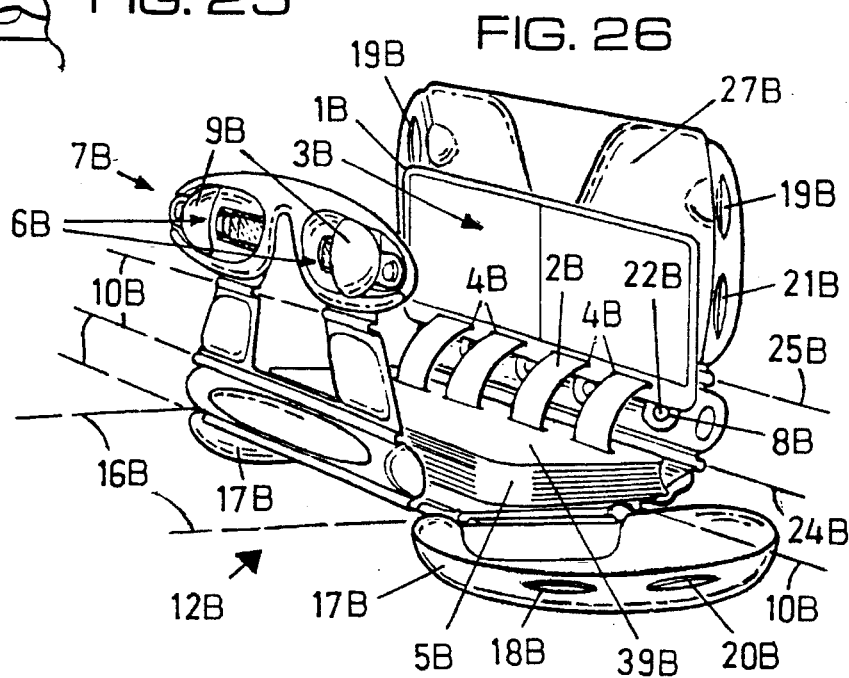

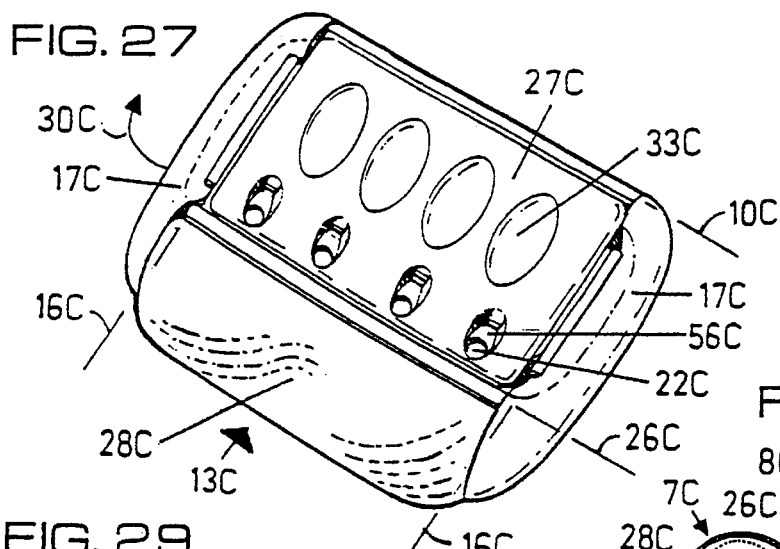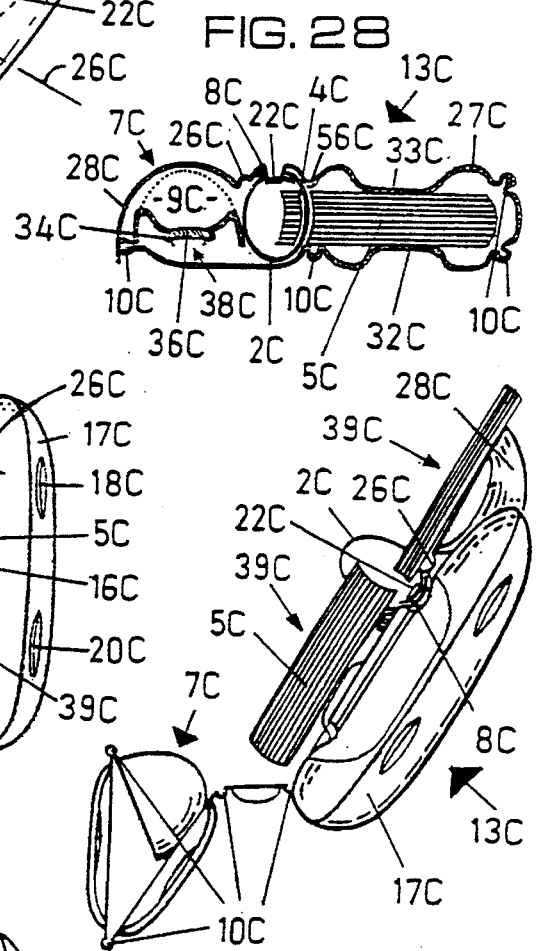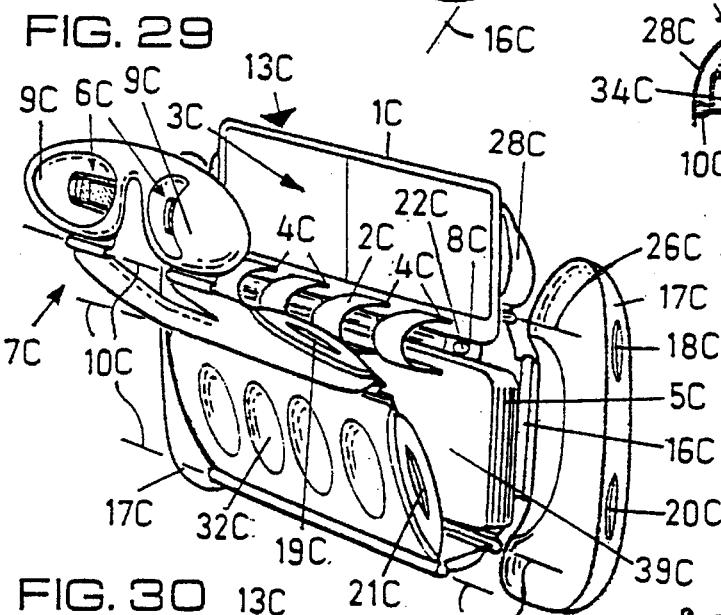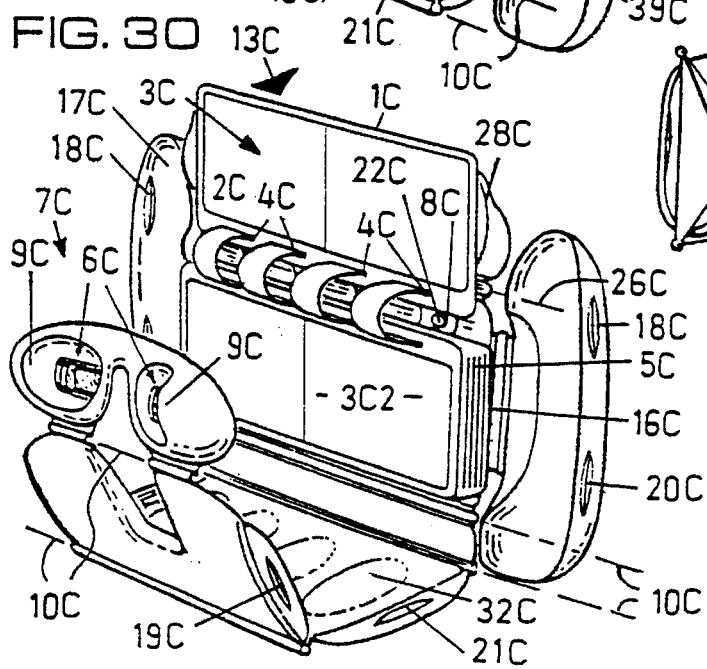

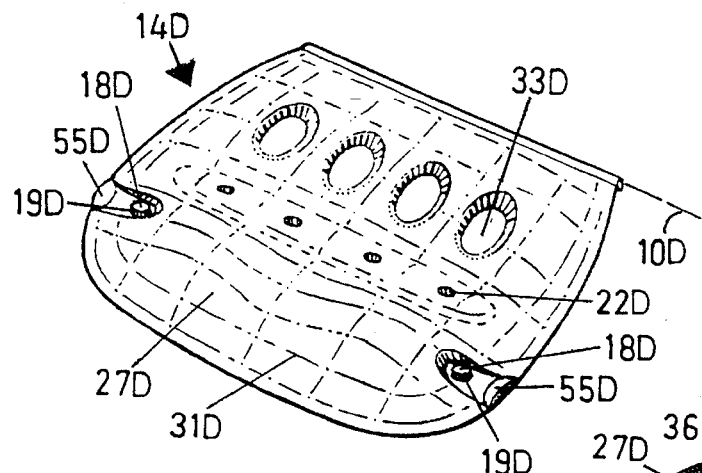
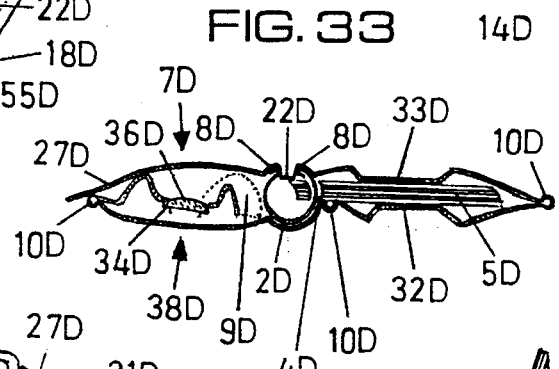
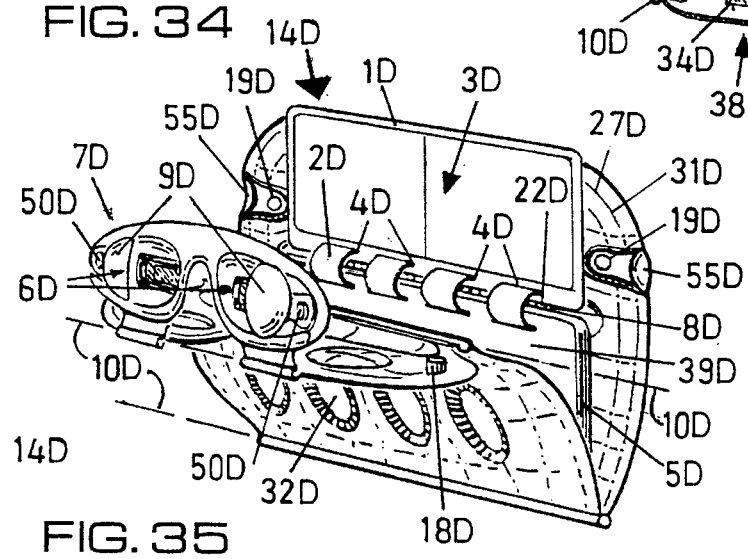
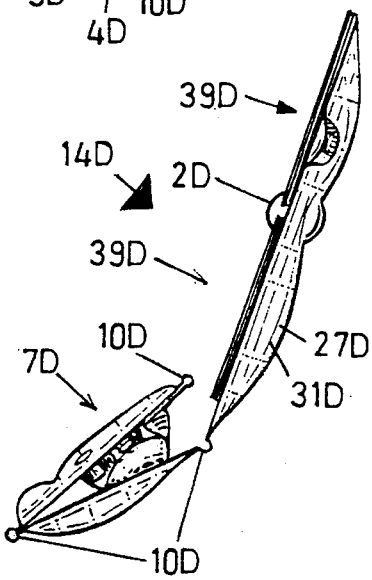
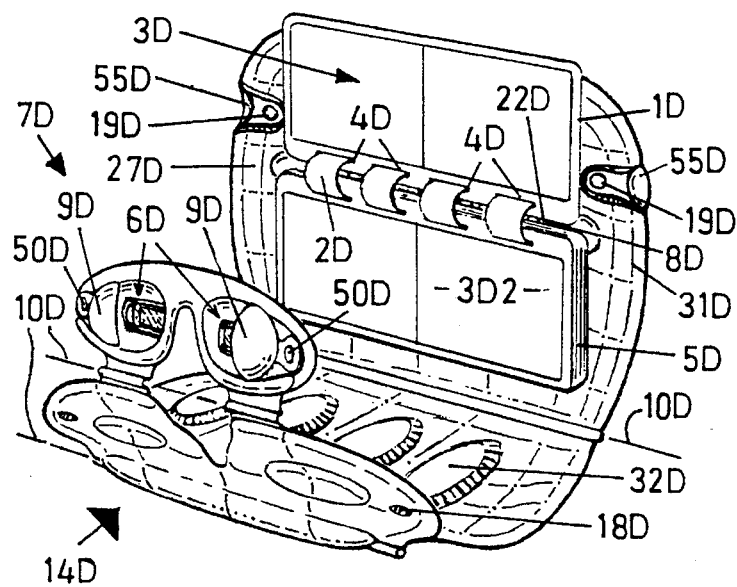

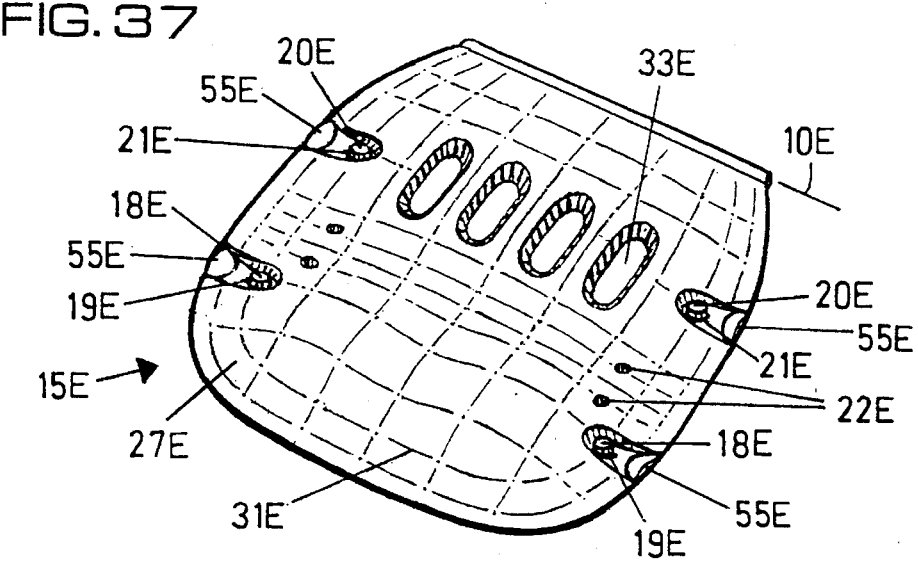
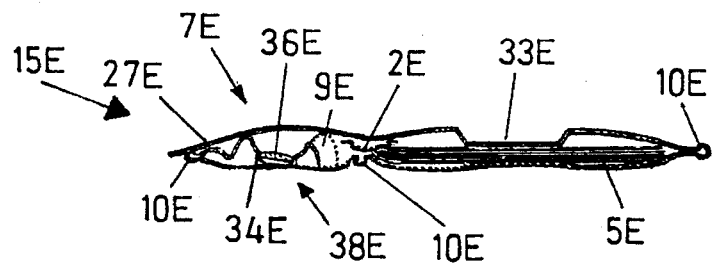
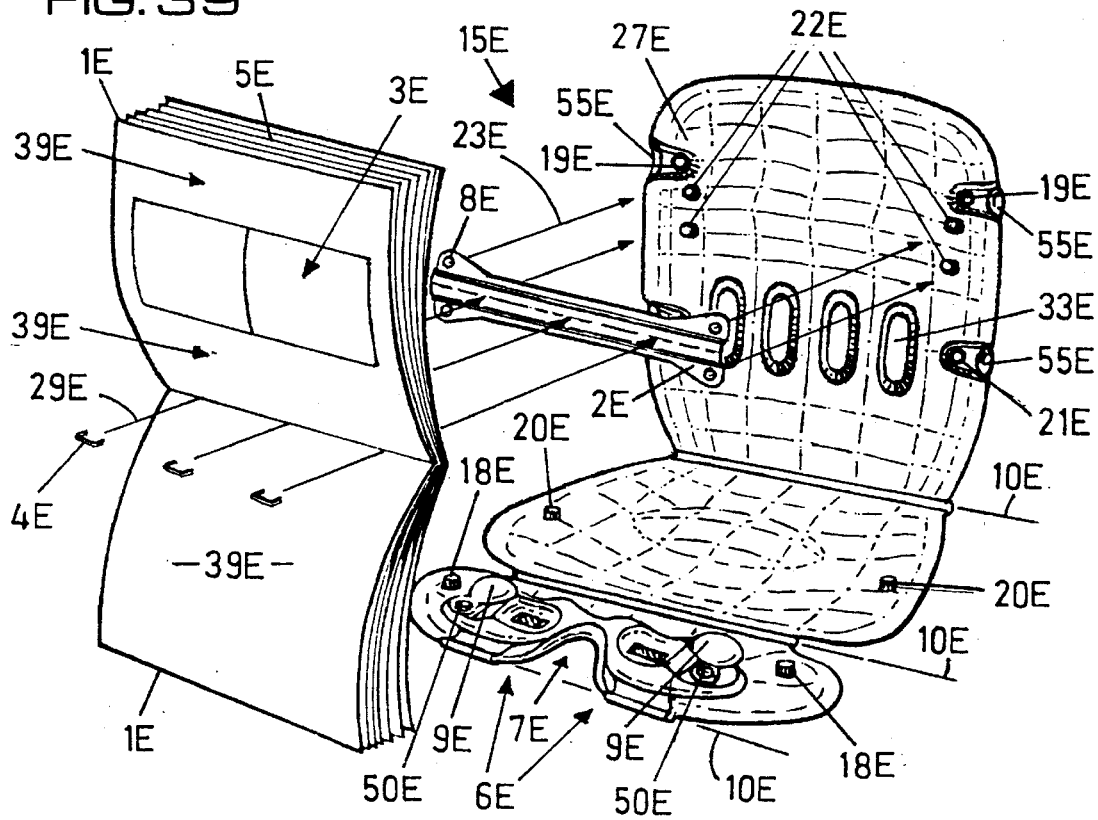

STEREOGRAPHIC BOOK

BACKGROUND AND SUMMARY OF THE INVENTION

This application is a continuation-in-part application of application Ser. No. 07/907,785 filed Jul. 1, 1992, now U.S. Pat. No. 5,309,280.

The present invention relates to a compact, hand-held and articulated apparatus which enables multiple pages of stereographic visual imagery to be arranged and reviewed sequentially in conjunction with multiple pages of textual content in a manner similar and related to a book.

More particularly, the present invention is directed to providing an affordable and thereby widely accessible, reusable publishing format that is user-interactive and capable of conveying substantial quantities of textual and stereographic visual content.

Stereographic/stereoscopic devices are numerous and various in type and well-known in the art. Generally, a stereoscope is an optical instrument configured to view stereographic imagery. The primary objective of the stereoscopic/stereographic art is to provide the user with a visual medium that approximates the experience of natural human visual perception of three-dimensional space. Depth perception is a phenomenon that naturally occurs as the right and left eyes each perceive simultaneously the spacial world in parallax, from two slightly different, horizontally displaced perspective viewpoints, which the brain fuses together and interprets, providing three-dimensional perception. A stereographic image typically consists of two separate images produced in a flat, planar, two-dimensional medium. The images of corresponding left and right perspective views are appropriately positioned next to each other so that their perspective viewpoints are horizontally displaced from each other by a distance that corresponds to the average interocular distance of the left and right eyes. Stereographic images are typically produced in photographic media, usually prints and transparencies, which are relatively expensive to mass produce. The two images, commonly referred to as a stereograph or a stereo-pair, when viewed with an optical viewer possessing two lenses with the appropriate optical and focal properties, enable each eye to see the corresponding image intended for it, thereby creating in the brain a perceived three-dimensional effect.

The present invention is designed to take advantage of the high-tech synthesizing power of computer imaging as well as high resolution digital printing to provide an affordable, accessible stereographic book that is capable of communicating complex three-dimensional visual concepts which are accompanied and augmented with textual information. Because of its ability to store and convey both stereographic imagery and readable text, the present invention can be utilized extensively for educational and entertainment purposes. In particular, the present invention is useful for visual novels and children's books, including reading primers, and also as an affordable, take-home visualization tool and study aid in the fields of chemistry, molecular biology, medicine, architecture, artistic sculpture, and other areas which benefit from seeing and understanding complex three-dimensional imagery.

The stereographic book of the present invention includes 3-D stereo visual images printed on a plurality of pages, a pivotal axis for said pages, and an optical viewer including two optical lenses or other type lens system. For the purposes of this application, the term "optical viewer" refers to a device, which by its spacial shape and ergonomic design, fits the human face as to enable the individual to look through an optical lens system and see imagery. The optical viewer is spacially oriented relative to the pages by means of a pivotal axis so that the optical viewer is optically aligned for viewing by the reader of the said 3-D stereo visual images. Readable text is printed on an opposite side of each of the plurality of pages from the 3-D stereo visual images and thus co-exists in a sequential manner with the 3-D stereo visual imagery. A durable plastic case is capable of opening and snapping shut by flexible lip tabs integrated into and with its spacial shape and design.

The plastic case provides protection for the optical viewer and the pages contained within the case. The plastic case enables the optical viewer and the pages stored within the case to be deployed and redeployed in an efficient, durable, reusable and compact manner. The plastic case includes an integral crease hinged pivotal axis for the optical viewer. The optical viewer, by the integrated means of its spacial shape and ergonomic design, is merged with and formed in one piece with the plastic case. Two clear plastic optical lens elements snap into the optical viewer body formed integrally with the plastic case. The printed pages are secured into the plastic case in spacial and optical alignment with the optical viewer using binder rings or other suitable fasteners that permit pivotal movement of said pages along a fixed axis of rotation.

Stereographic visual images typically include two separate, planar or two dimensional photographic, graphic, or computer generated images printed upon a flat page. The two images are spacially arranged with a focal center positioned about 2.5 inches apart. This is the average distance between the focal centers of the human eyes. When the two separate, flat, printed images are viewed with an optical viewer having two lenses and with the appropriate optical and focal properties, each eye sees a single corresponding image intended for it. The brain fuses these said images into a true three dimensional image, creating a spacial effect similar to that experienced by normal visual spacial perception in a spacial environment.

The spacial orientations, optical relationships and alignments, and pivotal axis alignments of the present invention enable the compact and durable co-existence of a plurality of printed stereographic visual images and substantial bodies of readable text, printed and oriented on the opposite sides of the stereographic visual image pages. The spacial orientations, optical relationships and alignments and pivotal axis alignments of these said devices enables the printed and readable text to be arranged sequentially in an alternative order with the stereographic visual images, thus enabling the present invention to function in a durable, reusable, and compact format which conveys three dimensional visual images and readable text in a manner similar to a book.

According to one aspect of the present invention, a stereographic book includes a base having a first portion and a second portion. The stereographic book also includes an optical viewer pivotably coupled to the first portion of the base about a first pivot axis. The stereographic book further includes a page including a first surface having an image thereon. The page is pivotably coupled to the second portion of the base about a second pivot axis spaced apart from the first pivot axis by a predetermined distance. Therefore, a user can pivot the page relative to the base portion and view the image through lenses of the optical viewer. According to another aspect of the invention, the optical viewer includes a lens system having a predetermined focal length substantially equal to the predetermined distance between the first pivot axis and the second pivot axis. Therefore, the image on the first surface of the page can be easily focused by a user by simply pivoting the optical viewer as the image is viewed through the lens system of the optical viewer.

According to yet another aspect of the present invention, a cover is pivotably coupled to the base. The cover is movable between an open position and a closed position. In its closed position, the cover engages the base to enclose and protect the pages and the optical viewer. The base is formed to include a flange extending around a top perimeter of the base, and the cover is formed to include at least one locking tab for engaging the flange to retain the cover in its closed position.

According to still another aspect of the present invention, the optical viewer includes first and second contoured sections configured to permit a user to pivot the optical viewer relative to the base. The optical viewer is formed to include a pair of outwardly extending ribs for protecting the lenses. The optical viewer is also formed to include a pair of indentions to permit the user to pivot the optical viewer relative to the base from a storage position substantially parallel to the base to an upright viewing position. In addition, the optical viewer is formed to include a slot for receiving a user's nose therethrough to facilitate viewing of the image through the lenses of the optical viewer.

According to a further aspect of the invention, the stereographic book includes a case including a bottom shell portion having a bottom surface, a front side wall, and a rear side wall. The case also includes a top shell pivotably coupled to the bottom shell adjacent the rear side wall of the bottom shell. The top shell is pivotable between a closed position and an open position. The top shell engages the bottom shell when the top shell is in its closed position to provide an enclosed region between the top and bottom shells.

The stereographic book also includes an optical viewer pivotably coupled to the bottom shell adjacent the front side wall. The optical viewer includes a lens system having a predetermined focal length. The optical viewer is pivotable between a storage position aligned substantially parallel to the bottom surface of the bottom shell and an upright viewing position.

The stereographic book further includes a plurality of pages. Each page includes a first surface having stereographic imagery printed thereon and a second surface having textual information printed thereon.

The stereographic book still further includes means for pivotably coupling the plurality of pages to the bottom shell adjacent the rear side wall of the bottom shell spaced apart from the optical viewer by a predetermined distance substantially equal to the predetermined focal length of the lens system. Each of the plurality of pages is pivotable relative to the bottom shell portion between an upright viewing position and a second reading position.

In the upright viewing position, the first surface of the page is aligned to face the lens system of the optical viewer so that a user can view the images through the lens system of the optical viewer to visualize a three dimensional image. In the second reading position, the pages are aligned substantially parallel to the bottom surface of the bottom shell and nested within the bottom shell.

The top shell of the case is pivotable relative to the bottom shell to its closed position to enclose and protect the plurality of pages and the optical viewer in the enclosed region between the top and bottom shells when the plurality of pages are in the second reading position and when the optical viewer is in its nested storage position.

The bottom shell includes a flange formed around a top perimeter of the bottom shell. The top shell includes an outer lip and locking tabs formed on the outer lip for engaging the flange of the bottom shell when the top shell is in its closed position to secure the plastic case in its closed position. The optical viewer includes left and right front frame sections positioned over the lenses to frame the left and right images, respectively.

The present invention as designated in the embodiments herein provides substantial advantages and improvements in relation to the first embodiment, designated as stereographic book 10 in FIGS. 1–9 below. Thus, the embodiments herein have as their objective the advancement of the state of the art in relation to the first embodiment and require additional designations and claims to the present invention.

The present invention is directed to improvement of a stereoscopic optical viewer which enables the user to view the stereographic or 3-D imagery conveyed by the stereographic book. One of the improvements of the optical viewer, as designated in each of the embodiments herein and also as indicated in the spirit and scope of the first embodiment, enables the interocular distance of the viewer's lenses to be adjusted to individual user viewing requirements.

The present invention is also directed to the configurations of an attachable and detachable binder system. One of the aspects of this particular device, as designated herein in each of the embodiments and also as indicated in the objective parameters of the first embodiment, enable the textual and 3-D visual content pages of the stereographic book to be updated, replaced with entirely new content, or rearranged and manipulated by the user to create interactive textual and 3-D image sequences while retaining the same format device.

The present invention is additionally directed to the pivotal axis configurations and structural features of a uni-piece articulated plastic chassis-type structure which facilitates the cooperative utilization of the optical, page, and binder components and also conforms into a protective shell which houses said components. The aspects of this particular device, as indicated in the objective parameters of the first embodiment and in each of the herein designated embodiments enable the present invention to be compact, hand-held, easy to operate, durable, and affordable.

Upon examination of said first embodiment of patent application (FIGS. 1–9) filed in the parent application and embodiments hereby designated, it should be understood by those skilled in the art that each of the embodiments inherently possess these hereby designated and allied objectives which are continuous and conterminous.

To provide a stereographic device which is configured to convey digitally processed and printed high-resolution 3-D imagery and readable text that co-exist in a sequential form and therefore function in a manner similar to a book. The relatively lower production costs of the means of digital image capture, creation, and printing enables said device to convey a substantially greater quantity of high quality 3-D images to the user for an affordable cost.

To provide said device for an affordable cost to the user, thereby making it widely accessible, by virtue of an articulated, integrally formed chassis-type case which is capable of being inexpensively fabricated with high-speed machinery and minimal hand assembly by the manufacturer.

To provide said device in a compact hand-held, easily operable form, by virtue of the pivotal configurations of an articulated, substantially bilaterally-symmetrical, integrally formed chassis-type structure which facilitates the cooperative utilization of the optical, page and binder elements by the user and also enables the user to manipulate said elements into an internalized and protective configuration.

To configure said chassis structure to be reasonably durable and more wear resistant—especially in pivotal areas—than cardboard, said structure being capable of functioning as a pivotable chassis for the cooperative utilization of the optical, page, and binder elements and also as the means of storage and protection of said elements.

To provide said compact, hand-held operable device with the capability to convey a relatively large quantity of textual and 3-D visual content; content for the purpose here being designated as the unit of quantity of 3-D images and text that can be entirely contained, stored, and displayed in the spacial confines of said device without additional augmentation. This objective is achieved by configuring the means of said device to utilize paper pages of an average thickness, configured to bear stereographic 3-D imagery printed with high resolution digital printing technology. Said pages are relatively thin and thus save space, unlike many previous devices in the art, which were concerned in their design and configurative objectives with conveying a relatively small quantity of images per said unit of content. These previous devices typically conveyed photographic prints or transparencies mounted on thick cards printed with a corresponding title for each image, with little or no spacial provision for text, in a manner similar to a photo album, which was the stated objective of most said prior devices.

This past necessity of card-mounting is understandable to those skilled in the evolution of the art: only photographic media could provide and maintain the desired clarity and resolution quality under the necessary magnification of the viewer optics. Under said magnification, prior printing technology ink-dot matrices were readily detectable and thus distracting to the user's contemplation of the image. High-resolution printing was not available in prior art, therefore most devices were configured to utilize photographic prints or transparencies. In order to maintain said photographic prints—which have an innate tendency to curl—in a rigid focal plane before the optics, said prints were mounted on thick cardboard, which required more space, therefore the quantity of images that could be self-contained in a compact device at one time without reloading or augmentation was relatively limited.

Similar spacial problems are inherent with photographic transparencies: warpage of the film medium will occur if the piece of film is not supported. The preferred solution is to mount said film in a re-enforcing frame of rigid material to maintain said film and its image in the focal plane. Said re-enforcing frames may require complex means to convey a large quantity of 3-D images in a hand-held device. An additional constraint exists with utilization of transparencies in compact devices. For proper viewing to be feasible, illumination must be provided behind the focal plane of the transparency positioned to be viewed. Thus, additional space must be allocated for whatever means or configuration is utilized to provide said illumination. This constraint effects the design parameters concerning the overall dimensions, juxtaposition and quantity of imagery to be stored and displayed per said unit of content in a device.

It is acknowledged that portable stereoscopic devices that utilize a strip of film that is temporarily supported as it is moved through a viewing aperture are extant in the art, but the fragility of such filmstrips, the low quantity of conveyable images per said unit of content, the relatively expensive cost of production and thus high cost to the user for the quantity of images obtained, and the sequential mode that limits filmstrip images to being conveyed in a strictly linear sequence, render the use of filmstrips as disadvantageous in the context of the present invention.

Thus, the objectionable, primary limitations of these aspects of prior art, if placed into the mass-publishing context of the objectives of the present invention are: mass-production of 3-D visual and textual publications containing relatively high quantities of content are too expensive to produce utilizing photographic media and the spacial and configuration constraints inherent with mounted photographic prints and transparencies are unsuitable to the stated objectives of said present invention and its objective parameters of affordably conveying high quantities of content while maintaining compact portability and hand-held operation.

Thus, an objective relating to the proceeding objectives:

To provide to the user of said device a conveniently operable format of spacial orientation and juxtaposition of said plurality of co-existing 3-D visual and textual content-bearing pages, said format also being in compliance with said objectives of said device to be compact and hand-held operable. This objective is achieved in the first embodiment and in each of the designated embodiments herein by configuring the page surfaces to pivot on an axis that is parallel to the pivotal axes coupled to the optical viewer.

To provide said device with an attachable, detachable, re-attachable, and interchangeable binder system which can be manipulated by the user to enable an individual or plurality of pages to be removed, rearranged, updated or replaced entirely with a new body of pages while retaining said device. This objective is achieved by various means that are designated in the first embodiment and herein. Each said binder system is configured to bind paper pages of a generally average thickness and permit said pages to pivot about an axis which is determined by the binder and the chassis.

It is respectfully submitted that the above annotated and designated objectives are continuous and conterminous in the first embodiment and the herein designated embodiments. The present application is directed to the necessary additional designations, comparisons, annotated drawings and claims of the present invention, which has as its primary objective the elimination of the various limitations and problems associated with prior art stereoscopic/stereographic book devices.

DESCRIPTION OF THE INVENTION OPTICAL VIEWER

Whereas the optical viewer of the stereographic book 10 as indicated in its first embodiment is capable of providing the optical, focal and image-field alignment functions necessary to convey stereographic imagery to the user, the designated embodiments herein are improved in these functions.

The optical viewer as designated in each of the embodiments herein provides the means for the lenses of said optical viewer to be adjusted to the individual user's pupil-to-pupil distance.

This capability of interocular adjustment increases the flexibility of the stereographic book by providing a more comfortable viewing experience to the user, and also greater access to stereographic viewing for users who are not able to see 3-D images with devices that utilize fixed, non-adjustable lens spacing.

Interocular adjustment is achieved by configuring the means of the eyepieces of the viewer body of said optical viewer, the viewer body being integrally formed, aligned and pivotally coupled to said articulated chassis; and also by the corresponding configuration of the injection-molded, transparent lenses, which are formed to co-operate and securely engage with the means of the eyepieces. Each eyepiece is integrally provided with two beveled channels, which are parallel to each other and the optical viewer pivotal axes and disposed one on each side of the eyepiece aperture so that said aperture lies between said beveled channels. Said bevels of said channels are formed to engage corresponding bevels on the optical lens so that said lens is in planar alignment with said eyepiece aperture, with an anti-scratch space between said lens and said aperture.

Said lens is secured between said beveled channels and is configured with an integral adjustment stud that can be manipulated by the user to enable the lens to slide in a plane defined by said channels, which thereby provide adjustment of the lens's focal center in relation to said aperture and thus, the user's pupil. Whereas each of the two eyepieces of the optical viewer are so configured, the capability of interocular adjustment is provided to the user.

When properly positioned by the user, the above annotated aperture of each eyepiece is proportionally configured to optically frame the image area intended for it, so that the corresponding left and right images are prevented from optically overlapping and interfering with each other. Image-overlap is a deviation which can hinder the brain's ability to fuse the left and right images of the stereo-pair into the desired 3-D image. Each aperture is positioned on the side of the eyepiece facing the image-bearing page positioned to be viewed, so that said lens is between the user's eye and said aperture. It is understood that each of the two apertures of the substantially bilaterally-symmetrical optical viewer are so configured.

Another aspect of improvement of the optical viewer of each of the embodiments designated herein is related to the optical performance of said optical viewer. The optical viewer of the present invention provides "immersive" viewing capabilities to the user, the term "immersive" being hereby defined as the optical capability to provide a high-resolution, full field of view with minimal perception of the image's bordering frames; accurately proportional image capability, which means the user perceives scenes and objects in full-scale, as if the user were present in the same space as the scene or object, thus, the user is "immersed" in the space depicted by the stereographic image-field; and the capability to provide peripheral monocular visual-fields to the left and right of the perceived stereo-visual field.

This designated immersive capability is co-operatively achieved and provided in the present invention by the corresponding optical and focal alignments of the means of said optical viewer, including said adjustable lenses and eyepiece apertures; the articulated chassis, which enables variable focusing and also image field alignment; the binder system, which provides the page pivotal axis and also aids in image alignment; and an improved stereographic format of the image-bearing page surface, said page format consisting of left and right stereo-paired high-resolution images which are optically configured to convey said left and right peripheral monocular visual-fields in addition to the primary 3-D visual-field. Thus, a simulation of natural human vision is attained, and the objective parameter of providing a viewing experience of high quality to the user is advanced.

Yet another modification to the optical viewer of the present invention in each of the designated embodiments herein is concerned with providing the means to shield the user's eyes from peripheral intrusion of stray light and glare, thus improving the quality of the viewing experience, and also configuring the viewer body to fit the human face around the eyes and nose in a comfortable and safe manner. These features are achieved similarly in herein designated stereographic books 11A and 13C with curved peripheral shields which are integrally merged with said viewer body. This configuration renders said viewer body with a higher spacial profile, which is kept within the stereographic book's objective parameter of overall compactness by its strategic placement within said chassis when said device is conformed into a storage mode.

The above annotated anti-glare and eye-safety features are achieved similarly in each of herein designated stereographic books 12B, 14D, and 15E by providing pivotable peripheral shields which can be manipulated by the user. Said pivotable shields may be positioned for utilization during viewing and then pivoted to a low-profile position when the means of said chassis are conformed into a storage mode. Thus, the objective parameter of compactness of the present invention is maintained.

Binder System

Whereas the binder clip system as designated in the first embodiment of stereographic book 10 is capable of providing an aligned pivotal axis for the plurality of pages of the page body and enabling said pages to be attached, rearranged, replaced, and re-attached, each of the embodiments herein designated are provided with binder systems that are improved in these functions.

The binder systems in each of the herein designated stereographic books 11A, 12B, 13C, and 14D are similar in configuration by virtue of a primary element of the binder systems hereby designated as the loop unit, which is separate from and attachable to said chassis, which is cooperatively configured with corresponding means to engage and secure the loop unit. The loop unit is advantageous because it is inexpensive to manufacture; is of a uni-piece construction; can be easily inserted into the corresponding page apertures; and can be easily and quickly attached, detached and re-attached to said means of said chassis.

Before deployment, the uni-piece loop unit is substantially flat and formed of a thin, flexible plastic material and is configured with four parallel bands, each of equal length and equidistant from each other; said four bands are integrally merged and branch uni-directionally from a band that is perpendicular to said four bands; said four bands each have an aperture of equal diameter at their unmerged ends; four apertures of said same diameter are disposed on said perpendicular band, each said aperture being equidistant, said distance corresponding to the distance between said end apertures. The ends of said four parallel bands are configured to be inserted into corresponding page apertures so that said plurality of pages are linked/bound by said four bands. Upon deployment, the loop unit is conformed by the user into the proper loop shape by fastening said apertures of said perpendicular band on the corresponding means of said chassis, said means consisting of integrally formed cylindrical studs configured in a diameter compatible to said loop unit apertures for secure engagement.

The ends of said four bands are thereafter looped and attached by said end apertures to said corresponding chassis studs so that said four bands form a parallel array of four equidistant loops, thereby securing said page body to said chassis, and providing an aligned pivotal page axis for said pages. It is understood that said loop unit may be configured with a different number of bands and other fastening means to securely engage said chassis, which also may be suitably adapted with corresponding fastening means.

The binder system of the embodiment designated herein as stereographic book 15E is modified to function within narrow-profile spacial parameters as stereographic book 15E is configured with a slim spacial profile, therefore the binder system is adapted to position pages without apertures or protruding, high-profile binder loops. The binder system is configured to utilize common staples, or vinyl-coated wire clips if page interchangeability is desired, which secure said pages to a binder spine. The binder spine is uni-piece and separate from, attachable to and detachable from said chassis.

The binder spine is formed of a plastic material and configured with a channel disposed along its length and centered on an axis of symmetry; said channel providing structural alignment and rigidity to said binder spine and thus, to said pages fastened thereto; said binder spine is configured with four apertures of equal diameter, which are arranged two on each end of said binder spine, each of said two end apertures being deposed one on each side of said axis of symmetry. Upon deployment, said apertures engage and fasten to the corresponding means of said chassis, said means consisting of four integral cylindrical studs of a compatible diameter to said binder spine apertures for secure engagement, thereby attaching said binder spine and therewith said pages to said chassis, thereafter providing the aligned page pivotal axis for said pages. It is understood that said chassis and said binder spine may be configured with other corresponding and suitable fastening means in addition to those annotated herein.

It is additionally annotated that the page format of stereographic book 15E is configured with bordering surface areas above and below the stereo-pair image area which enables textual information such as image-related captions or paragraphs to co-exist on the same page surface as the stereographic image. This arrangement allows visual and textual content to be creatively mixed on the page surface, and also increases the space for text, which spacially compensates for the slim profile of said embodiment.

Chassis

Whereas the first embodiment of said stereographic book 10 possesses the capability of focal adjustment, the herein designated embodiments are each more flexible in this function, which is achieved by increasing the number of parallel pivotal axes between the pivotal axis of the page body and the optical viewer. One of the objectives of this modification is to render the present invention as easily focusable as possible to the widest accessible range of users, including those users who are near or far-sighted.

It is determined that the user can easily align the intended 3-D images positioned to be viewed in terms of the top and bottom of the 3-D image field, and that focusing can also be quickly achieved by the user when the optical viewer is more articulated and permitted to move freely in the user's hand. Thus, the remaining primary objective for configuration of an optical viewer pivotally coupled in alignment with the 3-D image-bearing pages is to maintain the left and right images of a stereo-pair in precise horizontal alignment with the corresponding left and right apertures and optics of the optical viewer, which is crucial to enabling user perception of a 3-D image. Therefore, the designated embodiments herein render the task of top and bottom 3-D image-field alignment and focusing more flexible and casual in operation to the user while horizontal stereo-pair alignment with the means of the optical viewer is maintained without deviation.

The above annotated pivotal axes configuration that is primarily directed to the function of optical viewer focal adjustment is hereby designated as the viewer pivotal array.

The viewer pivotal array of each designated embodiment herein is similar to and continuous with the first embodiment in the functional aspect that each pivotal axis of the viewer pivotal array is parallel to the pivotal axis of the plurality of pages of the page body.

Another functional aspect of said viewer pivotal array is related to the continuous objective of said chassis to conform into a compact, protective shell. It is annotated that the embodiments designated herein as stereographic books 14D and 15E are similar in the aspect that each is configured to utilize the means of said viewer pivotal array to achieve said objective of compact and protective conformation, in addition to the primary task of optical viewer focal articulation and alignment. A related functional aspect to the above said conformation of said chassis of each of said embodiments 14D and 15E is hereby designated: each is integrally configured with corresponding fastening means which co-operate with said viewer pivotal array to engage and thereby secure said chassis in a closed and protective configuration when properly conformed by the user.

It is annotated that said viewer pivotal array also may cooperate in concert with additional pivotal axes array and means coupled to said configurations to enable said chassis to fold and conform into a protective shell. One of the additional pivotal axis configurations, which is specialized in the functional aspect of enabling said chassis to provide protective conformation, are hereby designated as end cap axes.

Each of the embodiments designated herein as stereographic books 11A, 12B, and 13C is provided with end cap axes which consist of two pivotable axes, which are parallel to each other and disposed one on each side of said plane of symmetry of said substantially bilaterally-symmetrical chassis, so that said chassis is interposed between said end cap axes.

The end cap axes are pivotably coupled to and integrally formed with two hereby designated end caps.

The end caps possess similar functional and configurative aspects in each of said embodiments designated as stereographic books 11A, 12B, and 13C, the end caps consisting of two concave when internally-oriented and convex when externally-oriented forms which are bilaterally-symmetrical to each other in form and feature and are parallel to each other and disposed one on each side of said common plane of symmetry of said bilaterally-symmetrical chassis, so that said end cap axes and said chassis are interposed between said end caps.

Each end cap in integrally configured with at least two protruding tabs, hereby designated as end cap tabs, on said concave side which cooperate to securely engage at least two aligned and corresponding indentations, hereby designated as snap-indents, which are integrally configured and located on said bilaterally-symmetrical chassis. The co-operative engagement of said end cap tabs with said snap-indents is achieved when the user appropriately pivots, manipulates and conforms the herein designated means of said articulated chassis into a compact, protective shell which when so conformed, internalizes the optical viewer, binder system, and page body of the present invention. It is understood that said engagement of said end cap tabs with said snap-indents secures the means of said chassis into a substantially closed position and that said end cap tabs and said snap-indents may be disengaged by the user to enable deployment and utilization of the present invention.

Another aspect of functional modification towards improvement of the present invention in relation to the first embodiment is directed to the objective of enabling the arrangement and display of multiple views of 3-D imagery in an extended sequence uninterrupted by textual content, thereby providing increased flexibility of the sequential flow of textual and 3-D image content.

The first embodiment and each of the embodiments designated herein as stereographic books 11A and 12B are similar in the aspect that the viewer pivotal configuration of the chassis is configured to provide to the user a single stereographic viewing position, whereby the 3-D image positioned to be viewed is located on a pivotally-oriented side of the page which can be defined as the surface which is adjacent to, upright from and above said page pivotal axis and facing towards, and thereby optically accessible to the means of said optical viewer.

The objective of enabling the present invention to display at least two 3-D images in sequence is achieved by modification of the above annotated single viewing position with the means of said chassis, which is provided in each of the embodiments designated herein as stereographic books 13C, 14D, and 15E by positioning the viewer pivotal array of said chassis to enable the pivotally-exposed page surface which is adjacent to said page pivotal axis and oriented below and opposite said upright page surface to be disposed in a substantially common plane as said upright page surface, so that both pivotally-exposed page surfaces are optically and sequentially accessible to said means of said optical viewer.

Thus, said configuration of two pivotally-exposed page surfaces, which are adjacent to and opposite each other, and disposed one on each side of said page pivotal axis in a substantially common plane, thereby enables both said page surfaces and 3-D imagery oriented thereon to be optically and sequentially accessible to said means of said optical viewer.

It is annotated that page interchangeability may be provided in designated stereographic books 13C and 14D by configuring said pages with binder-coupling apertures at top and bottom page areas which border and are parallel to the lines of text and the top and bottom edges of said stereo-pair so that upright textual and 3-D image pivotal orientation to the user of said optical viewer can be maintained regardless of sequential placement of said pages.

It is annotated that the page pivotal orientation designated in stereographic book 10 is continuous, conterminous and utilized in all herein designated embodiments, said page pivotal orientation defined as requiring a page having two exposable surfaces, whereby the first surface, when pivoted above said page pivotal axis and positioned in a substantially upright viewing position, has upright-oriented content thereon, and whereby the second surface, when positioned below said axis has content which also maintains upright orientation. To clarify, the second page surface content is inverted, or upside-down, in orientation to the content on the first surface. A readily available example of this pivotal orientation, which is based on a substantially horizontal pivotal axis, is United States coin currency, whereas a penny bearing Lincoln's portrait on the first surface must be pivoted on a horizontal axis to obtain correct upright orientation of the Lincoln Memorial portrayed on the second surface of the coin. Conversely, the United States paper dollar possesses a vertical pivotal orientation, as do most books.

Another aspect of modification towards improvement of each of designated embodiments herein of the present invention in relation to the first embodiment is associated with the improved focusing capabilities of said viewer pivotal array and the positioning of the 3-D image-bearing pages pivoted to be viewed. In the first embodiment, the said page in the upright viewing position is pivotally coupled to and rests on the binder clips and is held in position by the user's index and middle finger in the proper focal plane with no additional support provided, as illustrated in FIG. 9, #88.

The configured means of each of the designated embodiments herein provide additional support to said 3-D image-bearing pages positioned to be viewed.

One of the means of said page support is provided in a similar manner in each of the embodiments herein designated as stereographic books 11A, 12B, and 13C by a pivotal axis hereby designated as the cover axis, which is arranged parallel and adjacent to said page pivotal axis, so that said page pivotal axis is interposed substantially between said cover axis and said viewer pivotal array. The cover axis is integrally and pivotally coupled to a portion of said chassis hereto designated as the cover plate. When properly manipulated by the user, said cover axis and said cover plate co-operate with said binder system to provide the means of support upon which a page or plurality of pages of the page body may accumulate and rest in the position to be viewed.

Another modification to facilitate said page support is provided in each of the embodiments designated herein as stereographic books 14D and 15E by positioning of the page pivotal axis in a mid-mounted position on a rigid section of said articulated chassis which has substantial length and width to support said pages in a common plane on either side of said page pivotal axis. It is understood that said rigid section of said chassis has no integral pivotal axis within its boundaries, and that said page pivotal axis is determined by an attachable and detachable binder system fastened to said rigid section and is mid-mounted and parallel to said axes of said viewer pivotal array which is integrally and pivotally coupled to said rigid section on the side which is parallel and substantially between said page pivotal axis and the first pivotal axis of said viewer pivotal array.

With the benefits of these above annotated, functionally related means, the user can pivot said page to the viewing position and said position is not maintained by holding the page itself, but is instead maintained by holding said chassis. This is advantageous in terms of saving the relatively thin paper pages from wear due to excessive direct handling.

The above annotated configuration and method of process causes the relative thickness of the page body to vary in the viewing position and thus, the distance between the 3-D image-bearing page surface and the optics of said optical viewer also varies according to page accumulation. This said variable distance, which may either increase or decrease, depending on the direction and order of sequence said pages are pivoted, is compensated by said viewer pivotal array, which enables the user to rapidly and easily adjust and maintain correct focal length of the optics relative to said 3-D image-bearing page surface; and the co-operative articulation of said cover axis and said cover plate, which enables adjustment of the focal plane of said page surface relative to said optical viewer.

It is annotated that the chassis of said designated embodiments herein are each configured with indentations when said chassis is externally-oriented, said same of which are protrusions when said chassis is internally-oriented. Said configurations provide structural rigidity to portions of said chassis that are substantially interposed between said pivotal axes.

Whereupon it is ergonomically appropriate and beneficial, said externally-oriented indentations are configured to fit the user's hand and fingers to facilitate dexterity. Whereby it is structurally appropriate, said internally-oriented protrusions provide interior support for said page body, to deter said page body from bowing, warping or distressing when said chassis is in storage-mode conformation, or deployed for viewing and reading.

Said chassis portions may also be variously and selectively configured with thin channels which traverse the contours of the chassis shell in re-enforcing grid patterns. The chassis of the present invention is designed to be manufactured in an environmentally conscious manner, utilizing a minimum of plastic material, thereby requiring said chassis shell to be as thin as possible. In fact, the chassis shell structure can be configured to be as thin as one of the paper pages it conveys. Said channels provide structural strength to said chassis shell if it is so configured.

It is understood that said chassis can be manufactured utilizing vacuum-forming or injection-molding plastic fabrication processes.

It is understood that said chassis means as herein designated, including but not limited to, said viewer and storage-mode pivotal configurations; said cover-axis and cover plate; said rigid sections and portions; said end caps and end cap tabs and snap indents are formed simultaneously with the integral structure of said chassis of the present invention.

It is annotated that said first embodiment stereographic book 10 as designated in FIGS. 1–9 anticipates that the case of the device can be manufactured in metal, and it is annotated and anticipated that the embodiments designated herein may utilize metal-stamping and die-cutting fabrication technologies to render said pivotal axes, said chassis portions and sections and their designated features and therewith said functional aspects and geometries of said aspects of said chassis in aluminum or other appropriate metals, and that such techniques and materials may also be utilized to provide a thin metal shell configured to clad and thus augment said plastic chassis for increased durability, and that such configurations may be implemented in a cost efficient manner, thereby maintaining the objective parameters of providing an affordable, accessible and durable stereographic book device.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

A complete understanding of the present invention and other advantages and features thereof may be gained from a consideration of the following description of the preferred embodiments taken in conjunction with the accompanying drawings in which:

FIG. 10 is a perspective view of stereographic book 11A conformed into a closed storage mode;

FIG. 11 is a side cross-sectional view of device 11A which indicates the interior position of the components therein;

FIG. 12 is a perspective view of the binder loop unit and the stereograph-bearing pages;

FIG. 13 is a perspective view of device 11A which indicates the shape and orientation of the binder loop unit and page body upon engagement and the means by which said loop unit is attached to the chassis therewith;

FIG. 14 is a sectional front plan view of one eyepiece of the stereoscopic viewer which indicates the elements and features thereof, including lens adjustment to enable variable intraocular distance;

FIG. 15 is a perspective view of device 11A deployed and ready for utilization;

FIG. 16 is a side elevational view which indicates the position of device 11A in a viewing mode and an initial position of the page body;

FIG. 17 is a corresponding view of device 11A which relates to FIG. 16 and indicates the accumulation of the pivotable page body in the upright viewing position and the pivotal adaptation of device 11A to maintain correct focal length and plane during a viewing mode;

FIG. 18 is an illustration which indicates a typical position of the user's hands for holding a stereographic book of the present invention in a viewing mode and maintaining focal adjustment;

FIG. 19 is a side elevational view which indicates a typical position of device 11A for reading text;

FIG. 20 is a perspective view of stereographic book 12B conformed into a closed storage mode;

FIG. 21 is a side cross-sectional view of device 12B which indicates the interior position of the elements therein;

FIG. 22 is a side sectional view of one eyepiece of the low-profile version of the stereoscopic viewer which indicates the storage mode side profile and position of the peripheral shield;

FIG. 23 is a front sectional view of said one eyepiece which corresponds to FIG. 22 and indicates the position of the peripheral shield in storage-mode and the direction said shield is pivoted for deployment;

FIG. 24 is a front view which corresponds to FIG. 23 and indicates said shield in viewing-mode;

FIG. 25 is a side view of said same eyepiece of the previous three FIGS., which indicates the viewing mode side profile and position of said shield;

FIG. 26 is a perspective view of stereographic book 12B deployed and ready for utilization;

FIG. 27 is a top perspective view of stereographic book 13C conformed into a closed storage mode;

FIG. 28 is a side cross-sectional view of device 13C which indicates the interior position of the components therein;

FIG. 29 is a perspective view of device 13C which indicates a first viewing position;

FIG. 30 is a perspective view of device 13C which corresponds to FIG. 29 and indicates a second viewing position;

FIG. 31 is a side elevational view which indicates a typical position of device 13C for reading text;

FIG. 32 is a top perspective view of stereographic book 14D conformed into a closed storage mode;

FIG. 33 is a side cross-sectional view of device 14D which indicates the interior position of the components therein;

FIG. 34 is a perspective view of device 14D which indicates the approximate position of a first viewing position;

FIG. 35 is a perspective view of device 14D which corresponds to FIG. 34 and indicates a second viewing position;

FIG. 36 is a side elevational view which indicates a typical position of device 14D for reading text;

FIG. 37 is a top perspective view of stereographic book 15E conformed into a closed storage mode;

FIG. 38 is a side cross-sectional view of device 15E which indicates the interior position of the components therein; and FIG. 39 is a perspective view of device 15E which indicates a typical method of securing pages therein.

DETAILED DESCRIPTION OF THE DRAWINGS

Figure 1:
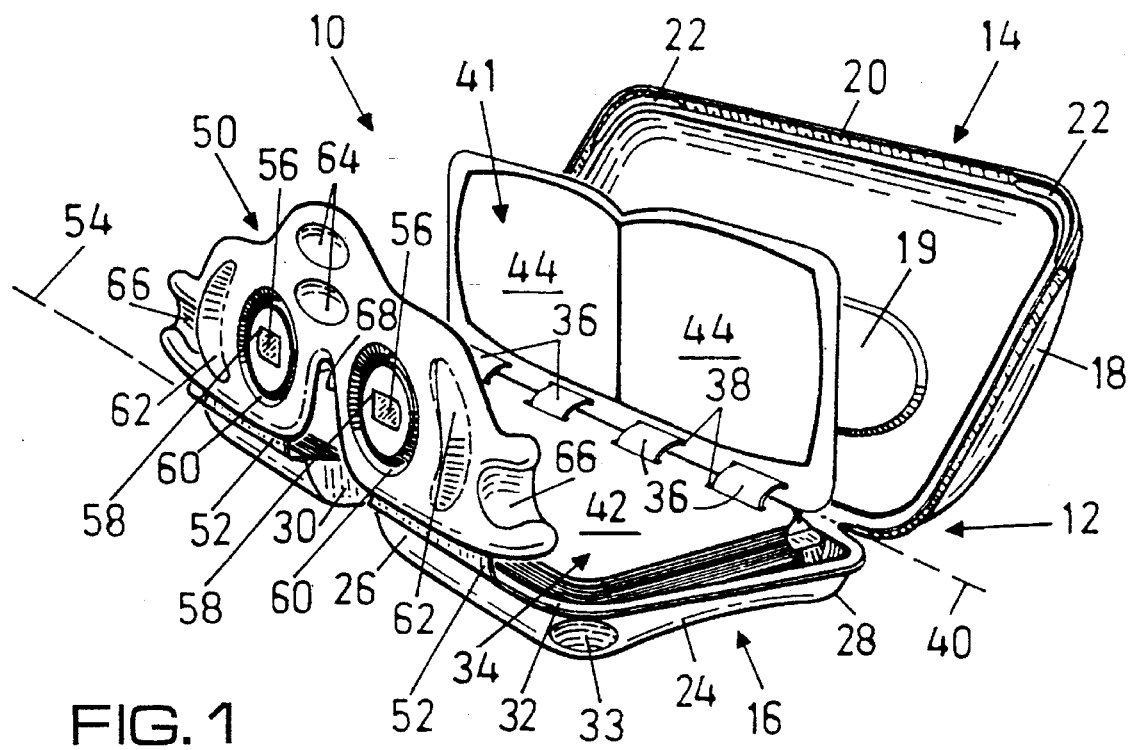
FIG. 1 is a perspective view of the stereographic book of the present invention illustrating an open case, a plurality of pages including textual and images printed thereon pivotably coupled to the case, and an optical viewer which is also pivotably coupled to the case.

Referring now to the drawings, FIG. 1 illustrates a stereographic book 10 of the present invention. Stereographic book 10 includes a plastic case 12 having a top shell portion 14 and a bottom shell portion 16. Top shell 14 is pivotably coupled to bottom shell 16 by creased hinge 17. Top shell 14 includes a convex top surface 18, and an outer rim or lip 20 having locking tabs 22 formed thereon. Top surface 18 includes a section 19 for receiving a title of the book 10. Bottom shell 16 includes a contoured bottom surface 24, a front side wall 26, and a rear side wall 28. Front side wall 26 is formed to include a notched section 30 configured to conform to the shape of a user's nose. An outer flange 32 is formed around a top perimeter or edge of bottom shell 16 to stabilize and strengthen bottom shell 16. As illustrated in detail in FIG. 3, lip 20 of top shell 14 covers flange 32 of bottom shell 16. Locking tabs 22 engage flange 32 to lock the plastic case 12 in a closed position illustrated in FIG. 2. Bottom shell 16 includes two indented regions 33 to provide an access area for a user's finger to disengage tabs 22 from flange 32 to unlock case 12.

Referring again to FIG. 1, stereographic book 10 includes a plurality of pages 34 similar to the pages of a book. Pages 34 are pivotably coupled to case 12 adjacent rear side wall 28 of bottom shell 16 by a plurality of binder clips 36 which extend through a plurality of apertures 38 formed in the plurality of pages 34. Therefore, each of the plurality of pages 34 pivots about a pivot axis 40. Each of the plurality of pages 34 includes a first surface 41 on which stereographic imagery is printed. Each of the plurality of pages 34 also includes a second surface 42 on which textual information is printed. First surface 41 includes two screens 44 for the stereographic imagery. Preferably, the images on screens 44 are produced using high resolution printing, computer imaging, or laser scanners to provide very high quality images.

Stereographic book 10 further includes an optical viewer 50 which permits a user to view images on screens 44 to provide a three-dimensional effect. Optical viewer 50 is pivotably coupled to bottom shell 16 by creased hinges 52 formed integrally with bottom shell 16. Optical viewer 50 is pivotable about a pivot axis 54 which is generally parallel to and spaced apart from the pivot axis 40 of the plurality of pages 34. Preferably, top shell 14, bottom shell 16, and optical viewer 50 are formed integrally and simultaneously from a plastic material using a vacuum forming technique. It is understood that other techniques can be used, such as injection molding. In addition, the case can be made from metal.

Optical viewer 50 includes two spaced apart lenses 56. A front frame 58 is positioned in front of each of the lenses 56 for framing for the images on screens 44. Lenses 56 are located within recessed sections 60 of viewer 50 and can be snapped into place. Elevated protecting ribs 62 are formed on optical viewer 50 to protect lenses 56 from damage. It is understood that the present invention is not limited to an optical viewer having two lenses 56. Any lens system for viewing images on screens 44 of page 41 may be used.

Optical viewer 50 is also formed to include a pair of indented sections 64 to permit the optical viewer 50 to be lifted to its upright viewing position illustrated in FIG. 1. Viewer 50 also includes contoured sections 66 which permit a user to control the angular position of viewer 50 relative to bottom shell 16 as discussed below with reference to FIG. 6. In addition, optical viewer 50 is formed to include a nose slot 68 for receiving the nose of a user therein.

Figure 2:
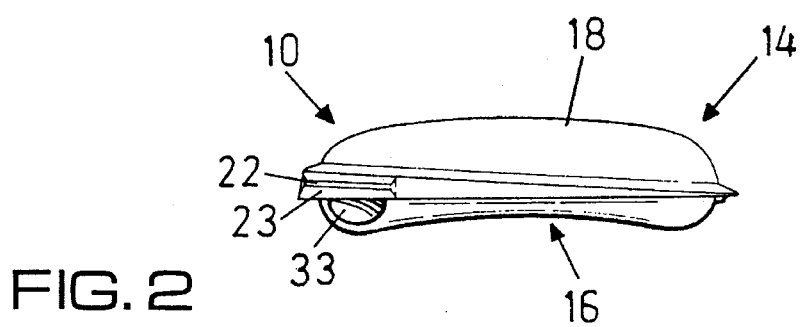
FIG. 2 is an end elevational view of the closed case.
Figure 3:
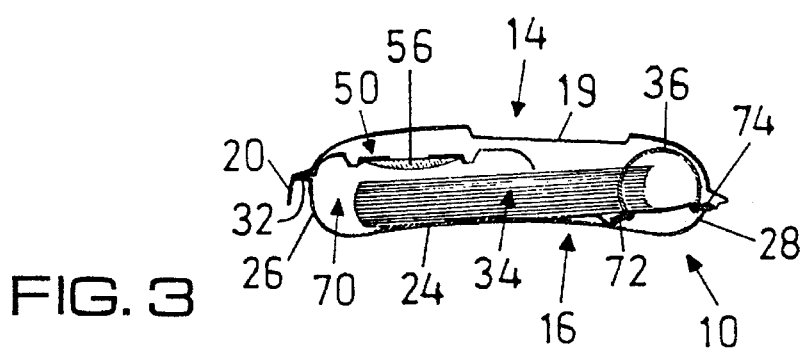
FIG. 3 is a sectional view taken through the case of FIG. 2 illustrating the optical viewer and the plurality of pages located in a nested storage position within an interior region of the closed case.

FIGS. 2 and 3 illustrate the stereographic book 10 of the present invention in its closed position for storage. In its stored position, all the pages 34 are located within an interior region 70 defined within plastic case 12. Optical viewer 50 is also pivoted about axis 54 to its storage position aligned substantially parallel to bottom surface 24 of bottom shell 16 so that top shell 14 can close over optical viewer 50 and lock to flange 32 of bottom shell 12. This provides a protective case 12 around optical viewer 50 and pages 34 to protect the components of book 10 from damage.

Figure 5:
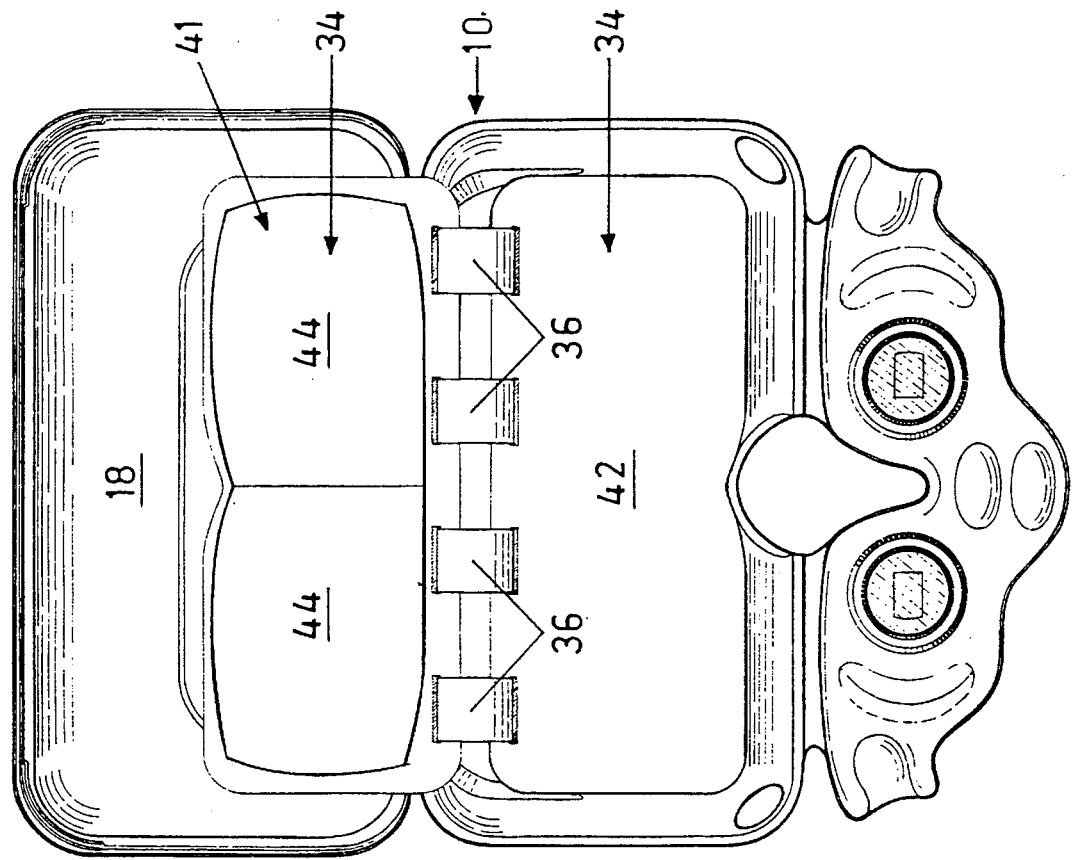
FIG. 5 is a top plan view similar to FIG. 5 in which one of the plurality of pages has been pivoted relative to the case.
Figure 4:
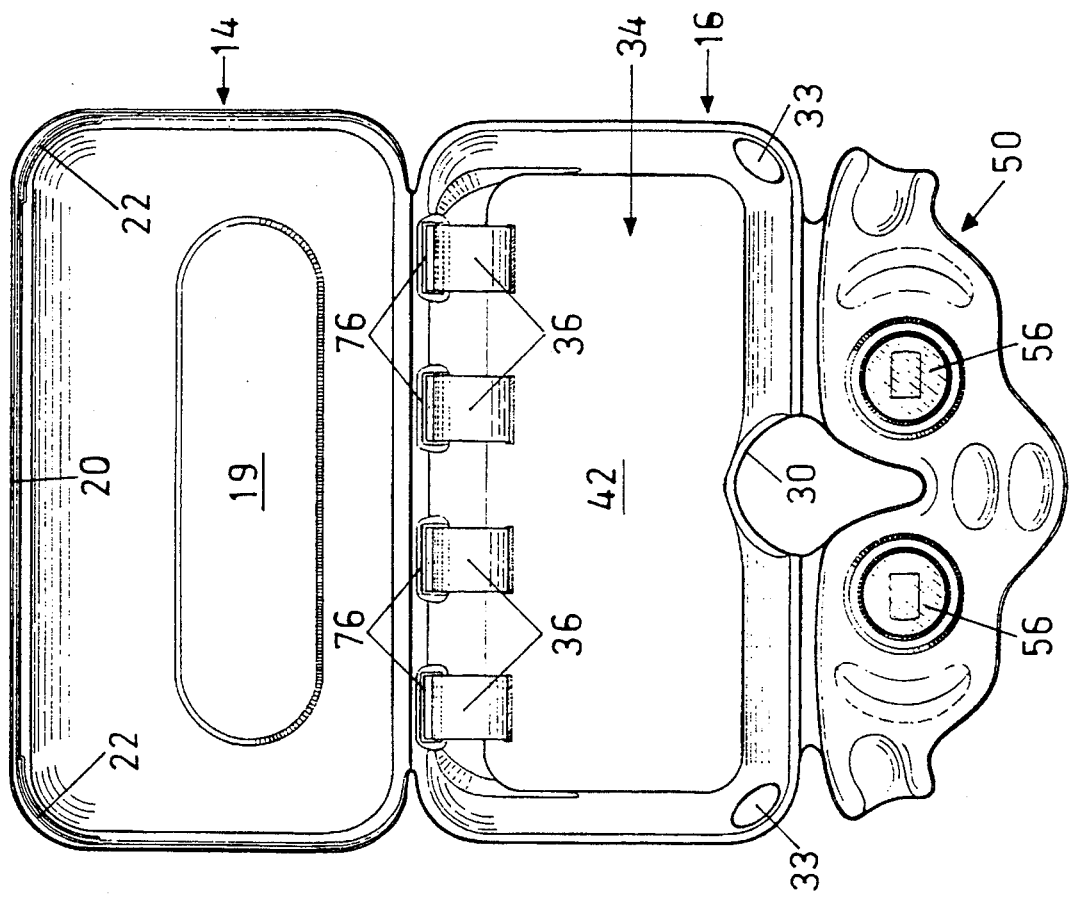
FIG. 4 is a top plan view illustrating the configuration of a top shell and a bottom shell of the case, and of the configuration of the plurality of pages coupled to the case by the plurality of binder clips.

Further details of the stereographic book 10 in its open position are illustrated in FIGS. 4 and 5. FIG. 4 illustrates the configuration of top shell 14 and bottom shell 16 with all of the plurality of pages 34 located in a reading position substantially parallel to bottom surface 24 of bottom shell 16. This position facilitates reading of the textual information on surface 42 of pages 34. FIGS. 3 and 4 illustrate how binder clips 36 are attached within the bottom shell 16. Specifically, binder clips 36 include flanges 72 and 74. Flanges 72 engage a portion of lower shell 12 as illustrated in FIG. 3. Flanges 74 extend through an aperture 76 formed in bottom shell 16 to secure binder clips 36 to bottom shell 16. FIG. 5 illustrates the configuration of the stereographic book 10 after at least one page 34 has been pivoted on binder clips 36 to reveal a stereographic imagery on screens 44.

Figure 6:
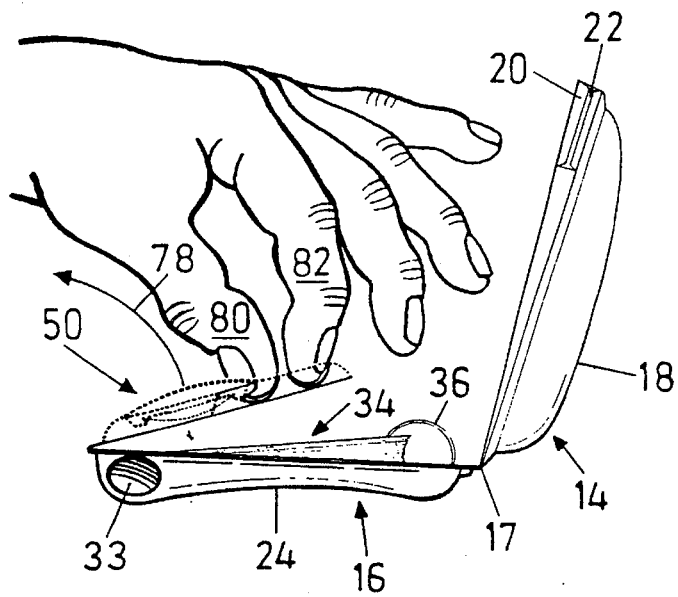
FIG. 6 is an end elevational view illustrating pivotal movement of the optical viewer of the stereographic book.

Operation of the stereographic book 10 is illustrated in FIGS. 6–9. When it is desired to use the book 10, a user pivots open top shell 14 relative to bottom shell 16 along creased hinge 17 to the position illustrated in FIG. 6. The user then grabs optical viewer 50 by lifter indentions 64 as illustrated in FIG. 6 to pivot viewer 50 relative to bottom shell 16 about pivot axis 54 in the direction of arrow 78 from its storage position illustrated in FIG. 3 to its upright viewing position illustrated in FIGS. 1, 8 and 9. Preferably, a user's thumb 80 and forefinger 82 are used to grab viewer 50 by lifter indentions 64 to pivot viewer 50 about axis 54.

Figure 7:
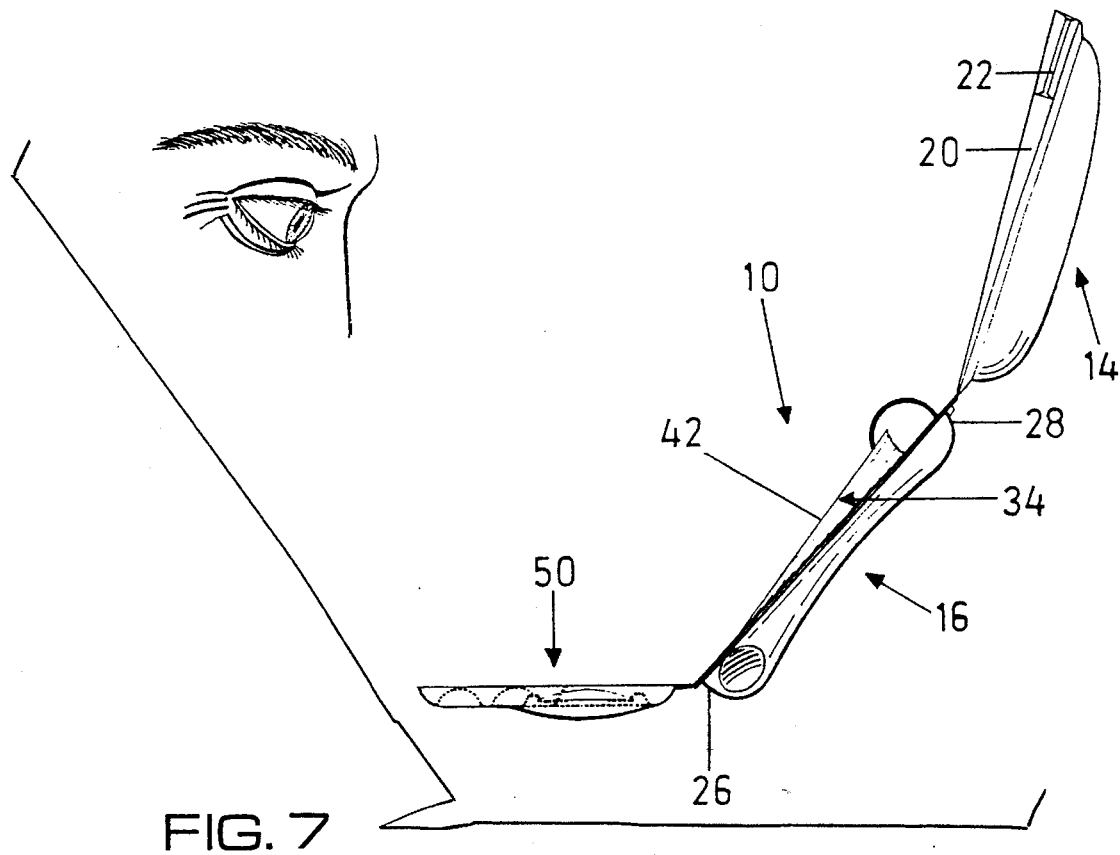
FIG. 7 is a side elevational view illustrating the position of the stereographic book for reading textual information printed on one surface of the plurality of pages.

FIG. 7 illustrates a user reading textual information located on surface 42 of pages 34. Textual material information can by any type of information including printed text copy from textbooks or children's books, or any other written media. Optical viewer 50 is not used to read the textual information on surface 42 of pages 34. As illustrated in FIG. 7, the stereographic book 10 of the present invention permits comfortable, normal reading of the textual information using the user's naked eye.

Figure 8:
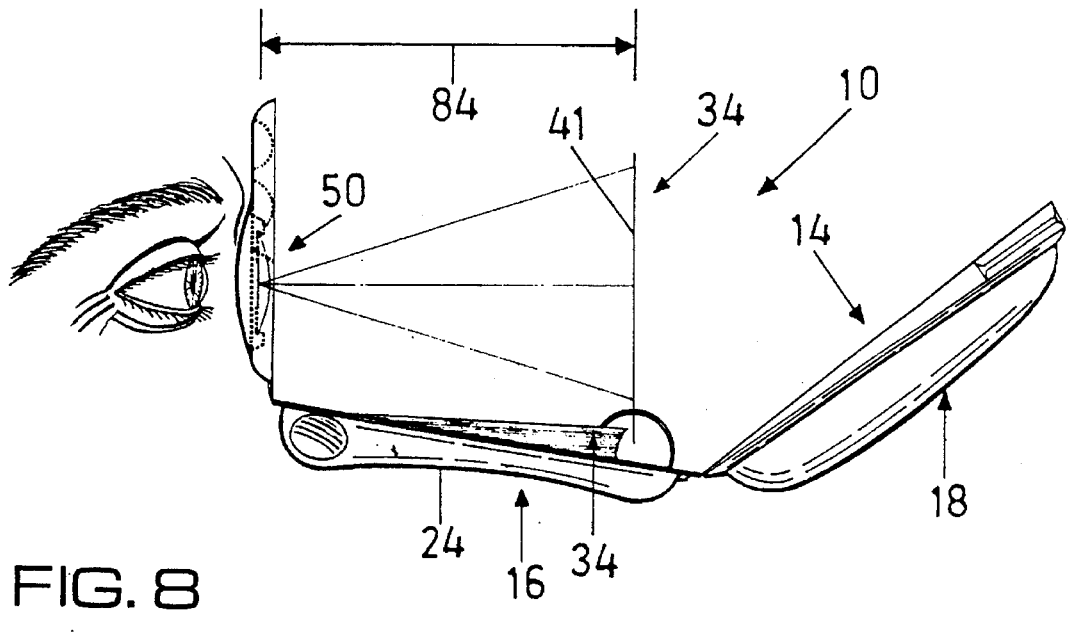
FIG. 8 is a side elevational view diagrammatically illustrating the position of an observer looking through the lens system of the optical viewer at an image printed on an opposite side of the plurality of pages from the textual information.
Figure 9:
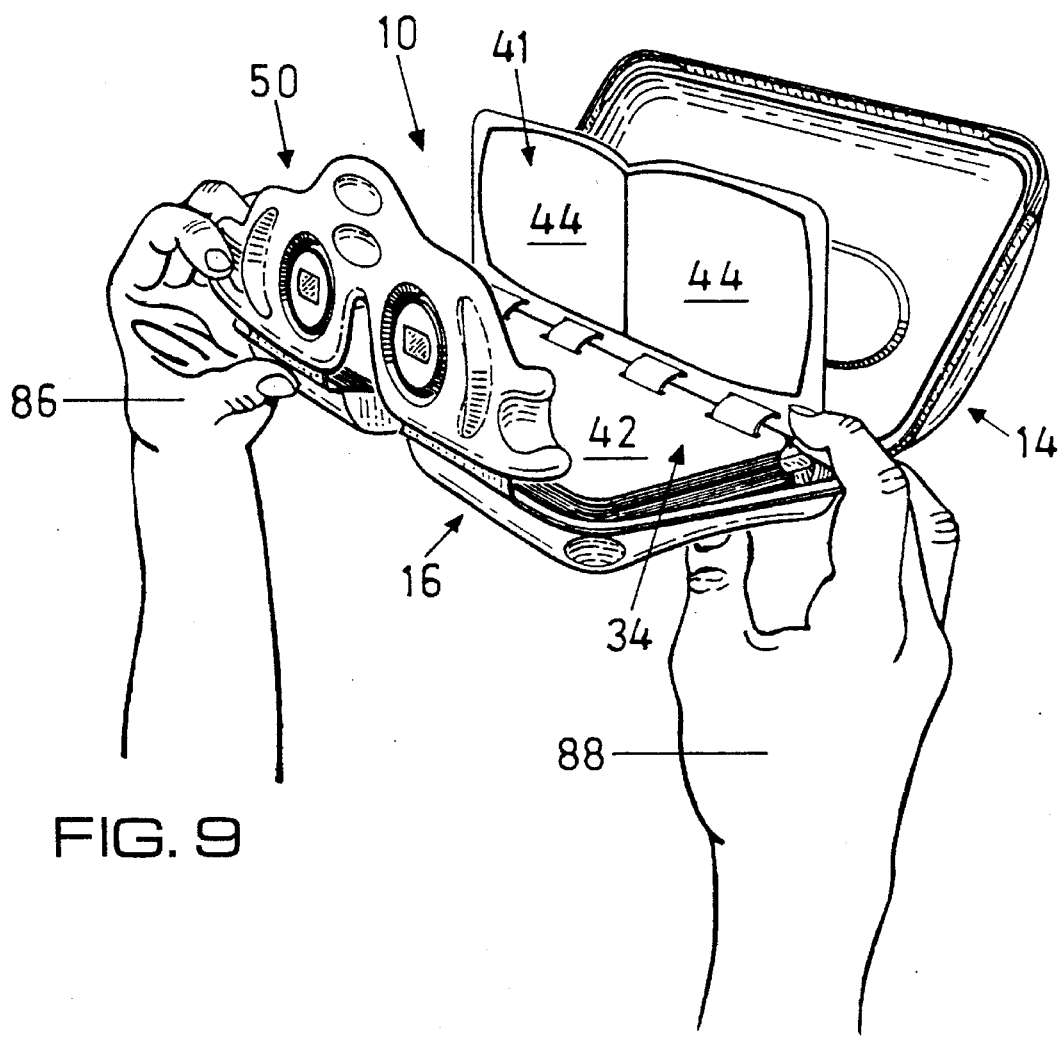
FIG. 9 is a perspective view illustrating the position of the stereographic book held within the hands of the user to facilitate viewing of the stereographic images.

After the textual information of the book located on surface 42 of page 34 is read, a user pivots the page 34 about axis 40 to an upright viewing position illustrated in FIGS. 1, 8 and 9. This displays stereographic imagery located on screens 44 on side 41 of page 34. In the upright viewing position, screens 44 of pages 34 are oriented in a direction facing optical viewer 50. As best illustrated in FIG. 8, user then looks through lenses 56 to view the stereographic images on screens 44. Such viewing permits a user to see a 3-D image.

It is understood that textual information can also be printed on surface 41 of pages 34 depending on the flow of the book. A user can read the text on page 41 without the use of optical viewer. Images, when appropriate, will always be located on surface 41, which faces viewer 50 when page 34 is in its upright viewing position.

The stereographic book 10 of the present invention provides an ergonomic design which is easy to manipulate and which advantageously provides a plurality of pages pivotably coupled to the container case 12 about a pivot axis 40 and an optical viewer 50 pivotably coupled to the case 12 about a pivot axis 54 spaced apart and generally parallel to the pivot axis 40. The distance between the axis 40 and axis 54 of optical viewer 50 is illustrated by dimension 84 in FIG. 8. Dimension 84 is preferably substantially equal to the focal length of the lenses 56. By setting dimension 84 substantially equal to the focal length of lens 56, it is easy for a user to focus the images on adjacent screens 44 by simply pivoting optical viewer 50.

FIG. 9 illustrates the preferred method for holding the stereographic book 10 of the present invention. Preferably, one hand 86 grasps optical viewer 50 between the index and middle fingers while the other hand 88 grasps bottom shell 16 and the upright page 34. It is understood that the user may switch hands so that hand 88 engages the contoured section 66 on the right side of optical viewer 50 while the left hand 86 of the user engages bottom shell 16 and upright page 34 of stereographic book 10. Therefore, by pivoting pages 34 and optical viewer 50, a user can easily focus the images after the optical viewer 50 is pivoted to its upright viewing position illustrated in FIGS. 1, 8 and 9 and the images on screens 44 of page 34 are pivoted to the upright position also illustrated in FIGS. 1, 8 and 9.

It is understood that more than one pair of stereographic images may be placed on image screens 44. Optical viewer 50 of the present invention is capable of focusing on a series of images on image screens 44 by simply pivoting the optical viewer 50 about its pivot axis 54 to change the direction of lenses 56 and by pivoting pages 34 about pivot axis 40. Therefore, the stereographic book 10 provides a substantial parallelogram configuration between optical viewer 50 and pages 34 so that by pivoting viewer 50 and pages 34 the images on surface 41 remain in focus.

The stereographic book 10 of the present invention can be made economically using vacuum form or injection molding techniques. The plurality of pages are printed in a conventional manner. However, the images on screens 44 are preferably printed using laser scanners, high resolution digital printers, or computer imaging. This improves the quality of the 3-D image seen through optical viewer 50. It is understood, however, that the present invention is not limited to images printed using these techniques.

Whereas the present invention is susceptible of various modifications and alternative constructions, the embodiments suggested in the drawings will herein be described in sufficient detail. It should be understood, however, it is not the intention to limit the invention to the particular forms disclosed, but to indicate the general spacial alignments and inherent geometries and thus define the functional and objective parameters of the present invention as expressed in the amended claims.

It is annotated that the major component indication numbers in the figures herein are numbered in parallel series for easy cross-reference. For example, the optical viewer of device 11A is numbered 7A, and the optical viewer of device 12B is numbered 7B. The embodiments are numbered and lettered in series: 11A, 12B, 13C, 14D, and 15E. The component numbers for device 11A end with the letter A, for example, the optical viewer of each embodiment herein is numbered 7, followed with an embodiment letter to place it in a specific context.

Referring to the drawings, FIG. 10 illustrates stereographic book 11A in a closed storage mode which enables device 11A to be as easily transported as any book, indeed, the device in each of the embodiments designated herein is designed to be casually thrown and knocked about by young students without incurring serious damage to the internal components.

Device 11A includes cover plate 27A and optics cover 28A which are pivotally coupled on pivotal axis 26A. Cover plate 27A includes finger indentations, one of which is indicated as 33A, and optics cover 28A includes structural grid pattern 31A to provide increased rigidity therewith, as does end cap 17A; it is understood that grid pattern 31A is included as a suggestion of one possible pattern by which thin grooves or channels could traverse the various contours and sections of the chassis to provide rigidity, and that all the illustrated figures herein may not include such suggested patterns.

Device 11A is configured with end caps 17A which pivot approximately 90° on end cap axes 16A in the direction of arrow 30A; said end caps 17A engage and secure to cover plate 27A and optics cover 28A with end cap tabs 20A and 18A respectively. The end caps 17A provide an unobstructive means to secure the articulated components of device 11A into a unified, compact configuration.

FIG. 11 reveals in cross-section the interior position of optical viewer 7A under optics cover 28A, viewer 7A includes beveled lens 36A, which is secured in beveled parallel channels, one of which is indicated as 34A; lens aperture 38A is revealed and the space occupied by peripheral shield 9A is indicated. All the parallel pivotal axes of viewer pivotal array 10A are revealed, as is cover plate axis 25A, optics cover axis 26A and binder system axis 24A, which does not function as a pivotal axis once the binder system is engaged. Chassis binder studs 22A fasten to loop unit 2A apertures 8A to secure and maintain the loop shape indicated in cross-section, which is inserted through page apertures 4A of the plurality of pages of the page body 5A. The contour profiles of finger indentations 33A and thumb indentations 32A are revealed in cross-section, and their additional function of supporting page body 5A is also apparent.

FIG. 12 illustrates binder loop unit 2A with fastening apertures, one of which is indicated as 8A, and page 1A configured with page apertures, one of which is indicated as 4A, to enable loop unit 2A to be inserted in the direction of parallel arrows, one of which is indicated as 29A, and thus bind page 1A and the plurality of pages of page body 5A. Page 1A indicates the placement of a stereograph 3A thereon.

FIG. 13 illustrates device 11A in a perspective view which reveals the various features, including the parallel array of eight chassis binder studs, two of which are indicated as 22A, which engage the loop unit apertures, one of which is indicated as 8A, in the direction of parallel arrows 23A, two of which are indicated. Binder pivotal axis 24A is only utilized to facilitate fastening of loop unit 2A apertures 8A to binder studs 22A, by providing a means of adjustment. The preferred method of installation is to first fasten the row of apertures 8A of the band which is perpendicular to and links the four parallel bands of loop unit 2A to the corresponding row of chassis binder studs 22A, thus leaving the ends of the four bands unfastened so they can then be inserted through apertures 4A of page body 5A. Each band of loop unit 2A is then "looped" in the shape generally indicated in FIG. 13 and fastened to its corresponding binder stud 22A, thus securing the page body 5A in pivotable alignment with optical viewer 7A.

FIG. 13 also indicates the post-deployment position of end caps 17A, which is perpendicular to the position indicated in FIG. 10. Also revealed in FIG. 13 are the corresponding end cap tabs and snap-indents, which are disengaged in this illustration. Upon conformation into storage-mode, end cap tab 18A engages snap-indent 19A on optics cover 28A, and end cap tab 20A engages snap-indent 21A on cover plate 27A. It is understood that other fasteners may be configured to maintain the closure of said end caps 17A with said chassis.

The end caps 17A are advantageous in their pivotal configuration and unobstructive placement because when pivoted to the position indicated in FIG. 13 (and also in other corresponding FIGS.), they enable incoming side light to reach the stereographic image-bearing surface of page 1A, and also permit the user to easily grasp and pivot the pages of page body 5A into a viewing or reading position.

FIG. 14 illustrates in a sectional front view of one eyepiece 6A of optical viewer 7A; it is annotated that each of the embodiments illustrated herein are basically similar in the means indicated for the configuration of lens 36A, aperture 38A, and interocular adjustment channels 34A. It is understood that other means may be utilized to fulfill these stated objectives. Eyepiece 6A includes transparent, beveled lens 36A which is secured by parallel, beveled channels 34A to enable lens 36A to slide in the direction indicated by arrow 35A, which the user can implement by using a fingernail to nudge lens stud 37A and thereby adjust lens 36A in relation to aperture 38A. Interocular adjustment is achieved when the two lenses 36A of optical viewer 7A are slid as indicated, and therewith determined by the user to be properly spaced apart so as to provide comfortable viewing of a stereographic image 3A on page 1A.

FIG. 15 illustrates device 11A fully deployed and ready for utilization, with page 1A pivoted into the viewing position. Binder loop unit 2A is secured by apertures 8A to chassis binder stud 22A to enable the plurality of pages to be pivotable. Textual content 39A is typically placed on the page surface indicated, but is not limited to this surface. The curvature of peripheral shields 9A can also be seen in FIG. 15.

FIG. 16 indicates the side elevational view of device 11A in a viewing position whereby page 1A, bearing a stereograph 3A is pivoted to a position which is accessible to the optics in viewer 7A. Focal length 41A is indicated as is chassis alignment line 40A which intersects pivotal axis 10A and cover axis 25A. Line 40A is provided for the purpose of comparison herewith corresponding line 40A of FIG. 17, to indicate a typical pivotal adaption that takes place in the chassis geometry of the present invention, including viewer pivotal configuration 10A, cover axis 25A and cover plate 27A upon accumulation of page body 5A in the viewing position as indicated in FIG. 17. Stereograph 3A in FIG. 17 is maintained at the correct focal length and angle of focal plane as indicated by focal length line 41A, which is equal to line 41A of FIG. 16. This hand-held operation is implemented by the co-operating articulated chassis when properly utilized by the user.

FIG. 18 is an illustration of a typical user hand position for holding and maintaining focal length and image alignment, which can be utilized with each of the embodiments designated herein. The hands are illustrated without a device for purposes of generalization and also visual clarity, but will be utilized herewith the specific component indication numbers and letters of device 11A to provide a specific example, whereas 42A indicates the position of thumb and index finger to grasp optical viewer 7A in the peripheral shield area 9A.

Thumb 43A of the other hand can utilize any of the four thumb-sized indentations 32A to support the device 11A therewith, and the four fingers 44A of the same hand may utilize finger indentations 33A to grasp cover plate 27A of device 11A. Optical alignment and focusing of the optical viewer 7A with stereographic image 3A on page 1A is achieved by the co-operative movement of the user's hands in the directions indicated by arrows 45A and 46A and becomes a casual, instinctual operation in approximately five minutes with a typical user.

It is understood that this cited example of hand-held user operation is suitable for all the herein designated embodiments; and that other methods of hand-held operation of the present invention may also be feasible and can be determined by the user.

FIG. 19 is an illustration of device 11A indicating a typical chassis position utilized during reading of textual content 39A, which can be placed in upright alignment on either or both pivotally exposed page surfaces, as indicated. Optical viewer 7A is shown in a non-deployed position, as it is not needed or recommended for usage of reading textual content, which is best achieved in the conventional manner.

FIG. 20 illustrates stereographic book 12B in a closed conformed storage mode. Device 12B is very similar to device 11A in basic pivotal configuration and operation. A variation of device 12B can be seen in the FIGS., whereas device 12B utilizes optical viewer 7B, which is configured with pivotable peripheral shields 9B to enable said viewer 7B to attain a lower profile than viewer 7A, thus, viewer 7B can be placed on top of page body 5B when in storage mode, which basically renders device 12B with a more narrow spatial configuration than device 11A. This said placement can be seen in cross-sectional view. FIG. 21, which also indicates that device 12B needs no optics cover as in device 11A, also indicated are the binder system components, loop unit 2B with apertures 8B and chassis binder studs 22B. This configuration is exactly the same in device 12B as in device 11A, as is the operation of said binder system.

FIG. 22 is a side sectional view of eyepiece 6B of viewer 7B which indicates peripheral shield 9B pivoted to a low-profile position. Also indicated are pivot stud 50B and inclined surface 52B, which can be seen from a front angle in corresponding FIG. 23, which further reveals aperture 51B of shield 9B and directional arrow 53B which indicates the pivotal direction for deployment of shield 9B. FIG. 24 indicates shield 9B deployed, and FIG. 25 reveals the side profile of eyepiece 6B thereafter, and how surface 52B positions shield 9B. It is understood that other pivotal configurations may be utilized to achieve adjustable, low-profile peripheral shields that are within the objective parameters of the present invention.

FIG. 26 illustrates device 12B deployed and ready for utilization. It is understood that the chassis and means of device 12B operate in a similar hand-held functional mode as indicated by FIG. 18.

FIG. 24 is a top perspective view of stereographic book 13C in a closed, conformed storage mode, and indicates the inverted position of pivotal end cap axes 16C which are coupled to cover plate 27C and enable end-caps 17C to pivot approximately 90° in the direction of arrow 30C. Also illustrated are four binder studs, one of which is indicated as 22C, which are seen from this external orientation as indentations, and are adjacent to indentations 56C, which serve as internally-oriented protrusions that aid in positioning loop unit 2C. This above designated configuration becomes clear upon examination of side cross-sectional view FIG. 28, which reveals these said features. The chassis modification of device 13C is also apparent, whereby the position of the binder 2C has been repositioned to a mid-mounted location, is also inverted, and instead of the loop unit 2C apertures 8C being fastened to two parallel rows of chassis binder studs, as in devices 11A and 12B, binder studs 22C consist of one row of four studs which each serve to secure two loop unit 2C apertures 8C in an overlapping fashion as seen in FIG. 28. The reason for the repositioning and modification of the binder system becomes apparent in Fig. 29 and FIG. 30. FIG. 29 illustrates device 12C deployed in a first viewing position, which enables the user to utilize optical viewer 7C (which is virtually identical to optical viewer 7A) to view the stereograph 3C as indicated, which rests on optics cover 28C in a viewing position. FIG. 30 offers a corresponding view of device 12C which indicates how the viewer pivotal array 10C enables a second viewing position so the user may also view stereograph 3C2 as indicated. FIG. 29 and FIG. 30 also shows corresponding end cap tabs 18C and 20C which engage snap-indents 19C and 21C respectively when device 12C is conformed into a storage mode. FIG. 31 is a side elevational view of device 12C in a typical reading position when textual content is placed on either one or both of the pivotally-exposed page surfaces as indicated. It is understood that the pivotal means of device 12C also permit focal adjustment for images in the first and second viewing positions regardless of page accumulation in either position, and that said hand-held focusing and alignment operational mode is similar to that described in FIG. 18.

FIG. 32 is a top perspective view of a stereographic book 14D which is a slim version of the present invention inspired by the Stealth bomber. Indicated in this view is a suggested structural grid pattern 31D for thin grooves which may traverse the contours of device 14D to provide additional strength. Also indicated are chassis fasteners 18D which are cylindrical studs which engage apertures 19D, located on cover plate 27D. The fasteners may be easily disengaged by the user by utilizing thumbnail-niche 55D to pry 18D and 19D apart. It is understood that other fastening means may be configured to achieve the objective of maintaining the device in a closed storage mode.

FIG. 33 offers a side cross-sectional view of device 14D and reveals the placement of the components therein, which is similar in pivotal and geometrical configuration to device 13C. A binder system consisting of loop unit 2D and binder studs 22D function the same as previously annotated in device 13C.

FIG. 34 provides a perspective view of device 14D in the previously annotated first viewing position. The location of snap-stud 18D is discernable as is its corresponding cover plate 27D aperture 19D. Optical viewer 7D is virtually identical to optical viewer 7B and operates in said same manner. FIG. 35 is a corresponding illustration to FIG. 34 indicating device 14D in the previously annotated second viewing position.

FIG. 34 is a side view of device 14D in a reading position, indicating how the pivotable means of the chassis can be folded while reading textual content 39D.

FIG. 37 is a top perspective view of stereographic book 15E, which is very similar to device 14D in its profile shape and pivotal configuration, except that it is slimmer than 14D and therefore utilizes a low-profile binder system. It is annotated that device 15E functions in an identical manner as device 14D, utilizes the same low-profile optical viewer as devices 12B and 14D, and is configured with identical chassis closure fasteners as 14D, except device 15E utilizes four fasteners instead of two as does device 14D.

FIG. 38 indicates in a cross-sectional view the position of the components therein, and binder spine 2E is seen in close proximity with the mid-axis of the viewer pivotal array 10E.

FIG. 39 indicates in a perspective view a typical fastening mode of page-body 5E, which is secured, as indicated by three parallel directional arrows, one of which is indicated as 29E, with common staples or wire clips to binder spine 2E; it is understood that other fastening means for securing said binder spine 2E to said cover plate 27E may be adapted and that other pivotable fastening means and page configurations may be utilized to fulfill the objective parameters of the present invention. Also indicated is a typical placement of stereographic image 3E and textual content 39E of page surface 1E. It is understood that 3-D images and textual content can be arranged on both pivotally-exposed page surfaces. FIG. 39 also reveals chassis studs 18E and 20E which correspond to and engage with cover plate 27E apertures 19E and 21E respectively to secure device 15E in a closed position.

Although the invention has been described in detail with reference to certain illustrated embodiments, variations and modifications exist within the scope and spirit of the invention as described and defined in the following claims.

What is claimed is:

1. A stereographic book comprising:

a page mount portion;

a plurality of pages having text and stereographic imagery thereon, the pages being pivotably coupled to the page mount portion about a page axis;

a stereographic viewer with a body including first and second eyepieces configured with first and second apertures provided with first and second lenses configured with means to enable interocular adjustment to facilitate viewing of the stereographic imagery thereon the pages positioned to be viewed;

a viewer pivotal array configured for pivotably coupling the stereographic viewer to the page mount portions, the viewer pivotal array including a plurality of pivotal axes interposed between and substantially parallel to the page pivotal axis and the stereographic viewer to facilitate alignment and focal adjustment of the stereographic viewer relative to the pages pivoted to be viewed;

a portion of said viewer pivotal array adjacent and pivotably coupled to the page mount portion configured to provide a supporting surface to a plurality of pages when positioned in the storage, viewing and reading configurations;

first and second end caps disposed on first and second substantially parallel pivotal axes coupled to first and second ends of said page support portion of said viewer pivotal array that is adjacent to said page mount portion so that said first and second end cap axes are substantially perpendicular to the page pivotal axis, and said viewer pivotable array portion is substantially between said first and second end cap pivotal axes;

said end caps configured with fastening means to facilitate closure when positioned in a storage configuration;

a cover plate adjacent and pivotably coupled to the page mount portion about an axis substantially parallel to the page pivotal axis so that said page mount portion is interposed substantially between the cover plate and said viewer pivotal array;

said cover plate configured to provide a page support surface when positioned in a viewing and reading configuration;

said cover plate configured with fastening means to engage corresponding fastening means configured therewith said end caps, to enable said cover plate and said end caps to co-operate and secure the page mount portion, the plurality of pages, the stereographic viewer, and the viewer pivotal array in a storage configuration.

2. The stereographic book of claim 1, wherein:

the stereographic viewer body is configured with first and second apertures each including two parallel beveled channels configured to slidably couple to corresponding beveled edges of the first and second lenses, respectively, to enable interocular adjustment to facilitate viewing of the stereographic imagery thereon the pages positioned to be viewed.

3. The stereographic book of claim 1, wherein:

the means for coupling the plurality of pages to the page mount portion includes binder studs integrally formed thereon, and an attachable and detachable loop unit configured to extend through apertures provided therewith the plurality of pages, the loop unit configured with corresponding apertures to engage said binder studs to couple said loop unit to said page mount portion to enable therewith the plurality of pages to be pivotable about a page pivotal axis.

4. The stereographic book of claim 3, wherein:

an optics cover is adjacent and pivotably coupled to the cover plate about an axis generally parallel to the page pivotal axis, the optics cover configured with fastening means to engage corresponding fastening means configured therewith said end caps, to co-operate in closure with said cover plate, to substantially enclose the stereographic viewer and the plurality of pages, the viewer pivotal array, and the page mount portion.

5. The stereographic book of claim 1, wherein:

the means for coupling the plurality of pages to the page mount portion includes binder studs integrally formed thereon, and a attachable and detachable binder spine configured with wire clips to secure therewith the plurality of pages, the binder spine configured with corresponding apertures to engage said binder studs to couple said binder spine to said page mount portion to enable therewith the plurality of pages to be pivotable about a page pivotal axis.

6. The stereographic book of claim 4, whereby:

the page mount portion, the stereographic viewer body, the viewer pivotal array, the end caps and end cap pivotal axes, the cover plate, the optics cover, and the fastening means and the configurative features thereof and therewith are integrally formed from a plastic material.

7. The stereographic book of claim 4, whereby:

the page mount portion, the stereographic viewer body, the viewer pivotal array, the ends caps and end cap pivotal axes, the cover plate, the optics cover, and the fastening means and the configurative features thereof and therewith are integrally formed from a metal material.

8. A stereographic book comprising:

a page mount portion;

said page mount portion configured to provide a cover plate including a page support surface when positioned in a viewing and reading configuration;

a plurality of pages having text and stereographic imagery thereon, the pages being pivotably coupled to the page mount portion about a page axis;

a stereographic viewer with a body including first and second eyepieces configured with first and second apertures provided with first and second lenses configured with means to enable interocular adjustment to facilitate viewing of the stereographic imagery thereon the pages positioned to be viewed;

a viewer pivotal array configured for pivotably coupling the stereographic viewer to the page mount portion, the viewer pivotal array including a plurality of pivotal axes interposed between and substantially parallel to the page pivotal axis and the stereographic viewer to facilitate alignment and focal adjustment of the stereographic viewer relative to the pages pivoted to be viewed;

first and second end caps disposed on first and second substantially parallel pivotal axes coupled to first and second ends of the page mount portion so that the first and second end cap axes are substantially perpendicular to the page pivotal axis, and said page mount option is substantially between said first and second end cap pivotal axes, the end caps configured with fastening means to engage corresponding fastening means configured therewith co-operating portions of said viewer pivotal array to enable said end caps to secure said viewer pivotal array, said stereographic viewer, said page mount portion, and said plurality of pages in a storage configuration;

an optics cover adjacent and pivotably coupled to the page pivotal portion about an axis substantially parallel to the page pivotal axis, configured to work in-concert with said end caps to substantially enclose the stereographic viewer upon conformation into a storage configuration.

9. The stereographic book of claim 8, wherein:

said optics cover is configured to provide page support to the plurality of pages positioned to be viewed.

10. The stereographic book of claim 8, wherein:

the stereographic viewer body is configured with first and second apertures each including two parallel beveled channels configured to slidably couple to corresponding beveled edge of the first and second lenses, respectively, to enable interocular adjustment to facilitate viewing of the stereographic imagery thereon the pages positioned to be viewed.

11. The stereographic book of claim 8, wherein:

the means for coupling the plurality of pages to the page mount portion includes binder studs integrally formed thereon, and an attachable and detachable loop unit configured to extend through apertures provided therewith the plurality of pages, the loop unit configured with corresponding apertures to engage said binder studs to couple said loop unit to said page mount portion to enable therewith the plurality of pages to be pivotable about a page pivotal axis.

12. The stereographic book of claim 8, wherein:

the means for coupling the plurality of pages to the page mount portion includes binder studs integrally formed thereon, and an attachable and detachable binder spine configured with wire clips to secure therewith the plurality of pages, the binder spine configured with corresponding apertures to engage said binder studs to couple said binder spine to said page mount portion to enable therewith the plurality of pages to be pivotable about a page pivotal axis.

13. The stereographic book of claim 8, whereby:

the page mount portion, the stereographic viewer body, the viewer pivotal array, the end caps and end cap pivotal axes, the cover plate, the optics cover, and the fastening means and the configurative features thereof and therewith are integrally formed from a plastic material.

14. The stereographic book of claim 8, whereby:

the page mount portion, the stereographic viewer body, the viewer pivotal array, the ends caps and end cap pivotal axes, the cover plate, the optics cover, and the fastening means and the configurative features thereof and therewith are integrally formed from a metal material.

15. A stereographic book comprising:

a page mount portion;

said page mount portion configured to provide a cover plate including a page support surface when positioned in a viewing and reading configuration;

said page mount portion configured with fastening means to facilitate closure when co-operatively positioned in a storage configuration;

a plurality of pages having text and stereographic imagery thereon, the pages being pivotally coupled to the page mount portion about a page axis;

a stereographic viewer with a body including first and second eyepieces configured with first and second apertures provided with first and second lenses configured with means to enable interocular adjustment to facilitate viewing of the stereographic imagery thereon the pages positioned to be viewed;

a viewer pivotal array configured for pivotably coupling the stereographic viewer to the page mount portion, the viewer pivotal array including a plurality of pivotal axes interposed between and substantially parallel to the page pivotal axis and the stereographic viewer to facilitate alignment and focal adjustment of the stereographic viewer relative to the pages pivoted to be viewed;

said viewer pivotal array configured with fastening means to engage corresponding fastening means configured therewith said page mount portion to secure said viewer pivotal array, said stereographic viewer, said plurality of pages in a storage configuration.

16. The stereographic book of claim 15, wherein:

the stereographic viewer body is configured with first and second apertures each including two parallel beveled channels configured to slidably couple to corresponding beveled edges of the first and second lenses, respectively, to enable interocular adjustment to facilitate viewing of the stereographic imagery thereon the pages positioned to be viewed.

17. The stereographic book of claim 15, wherein:

the means for coupling the plurality of pages to the page mount portion includes binder studs integrally formed thereon, and an attachable and detachable binder spine configured with wire clips to secure therewith the plurality of pages, the binder spine configured with corresponding apertures to engage said binder studs to couple said binder spine to said page mount portion to enable therewith the plurality of pages to be pivotable about a page pivotal axis.

18. The stereographic book of claim 15, wherein:

the means for coupling the plurality of pages to the page mount portion includes binder studs integrally formed thereon, and an attachable and detachable loop unit configured to extend through apertures provided therewith the plurality of pages, the loop unit configured with corresponding apertures to engage said binder studs to couple said loop unit to said page mount portion to enable therewith the plurality of pages to be pivotable about a page pivotal axis.

19. The stereographic book of claim 15, whereby:

the page mount portion, the stereographic viewer body, the viewer pivotal array and the fastening means and configurative features thereof and therewith are integrally formed from a metal material.

* * * * *